United States Patent
Nachimuthu et al.

(10) Patent No.: US 11,831,486 B2
(45) Date of Patent: *Nov. 28, 2023

(54) OUT-OF-BAND MANAGEMENT OF FPGA BITSTREAMS

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,707

(22) Filed: Mar. 23, 2022

(65) Prior Publication Data
US 2022/0329474 A1 Oct. 13, 2022

Related U.S. Application Data

(63) Continuation of application No. 15/829,935, filed on Dec. 3, 2017, now Pat. No. 11,296,921.

(51) Int. Cl.
*H04L 41/046* (2022.01)
*G06F 15/78* (2006.01)
(Continued)

(52) U.S. Cl.
CPC ........ *H04L 41/046* (2013.01); *G06F 15/7889* (2013.01); *G06F 30/34* (2020.01);
(Continued)

(58) Field of Classification Search
CPC ...... G06F 15/7889; G06F 21/62; G06F 21/85; G06F 30/34; H04L 9/0894; H04L 41/046; H04L 41/0896; H04L 63/10
See application file for complete search history.

(56) References Cited

U.S. PATENT DOCUMENTS

| 11,296,921 B2* | 4/2022 | Nachimuthu ....... G06F 15/7889 |
| 2003/0163298 A1* | 8/2003 | Odom ..................... G06F 30/34 |
| | | 714/E11.17 |

(Continued)

OTHER PUBLICATIONS

Advisory Action for U.S. Appl. No. 15/829,935, dated Oct. 18, 2021, 3 pages.

(Continued)

*Primary Examiner* — Jeong S Park
(74) *Attorney, Agent, or Firm* — Compass IP Law PC

(57) ABSTRACT

Mechanisms for out-of-band (OOB) management of Field Programmable Gate Array (FPGA) bitstreams and associated methods, apparatus, systems and firmware. Under a first OOB mechanism, a management component, such as a baseband management controller (BMC) is coupled to a processor including an agent in a compute node that includes an FGPA. An FPGA bitstream file is provided to the BMC, and the agent reads the file from the BMC and streams the FPGA bitstream contents in the file to the FPGA to program it. Under second and third OOB mechanisms, a pointer to an FPGA bitstream file that identifies the location of the file that is accessible via a network or fabric is provided to the BMC or other management entity. The BMC/management entity forwards the pointer to BIOS running on the compute node or an agent on the processor. The BIOS or agent then uses the pointer to retrieve the FPGA bitstream file via the network or fabric, as applicable, and streams the FPGA bitstream to the FPGA to program it.

20 Claims, 14 Drawing Sheets

(51) Int. Cl.
    *H04L 41/0896* (2022.01)
    *H04L 9/08* (2006.01)
    *G06F 30/34* (2020.01)
    *G06F 13/42* (2006.01)
    *G06F 21/76* (2013.01)

(52) U.S. Cl.
    CPC ........ *H04L 9/0894* (2013.01); *H04L 41/0896* (2013.01); *G06F 13/4221* (2013.01); *G06F 21/76* (2013.01); *H04L 2209/122* (2013.01)

(56) References Cited

U.S. PATENT DOCUMENTS

| | | | |
|---|---|---|---|
| 2003/0163715 A1* | 8/2003 | Wong | G06F 21/76 713/191 |
| 2010/0235833 A1 | 9/2010 | Huang et al. | |
| 2012/0260078 A1* | 10/2012 | Varnum | G06F 15/7871 713/2 |
| 2013/0103875 A1* | 4/2013 | Chang | G06F 13/4282 710/310 |
| 2015/0169489 A1* | 6/2015 | Edvenson | G06F 13/4022 710/316 |
| 2016/0283221 A1* | 9/2016 | Kochar | G06F 8/654 |
| 2017/0155573 A1* | 6/2017 | Khemani | H04L 41/0663 |
| 2018/0081849 A1* | 3/2018 | Remis | G06F 13/4022 |
| 2018/0121664 A1* | 5/2018 | Gourley | H04L 63/108 |

OTHER PUBLICATIONS

Final Office Action for U.S. Appl. No. 15/829,935, dated Aug. 16, 2021, 13 pages.

First Office Action for U.S. Appl. No. 15/829,935, dated Feb. 17, 2021, 9 pages.

Notice of Allowance for U.S. Appl. No. 15/829,935, dated Dec. 3, 2021, 6 pages.

* cited by examiner

OUT-OF-BAND MANAGEMENT OF FPGA BITSTREAMS

This application is a continuation of U.S. application Ser. No. 15/829,935 filed Dec. 3, 2017, entitled "OUT-OF-BAND MANAGEMENT OF FPGA BITSTREAMS", which is incorporated in its entirety herein.

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8×large with 117 GB of memory, 16/35 cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a flowchart illustrating operations for programming an FGPA using the architectures of FIGS. 6 and 6a;

DETAILED DESCRIPTION

Figure 1:
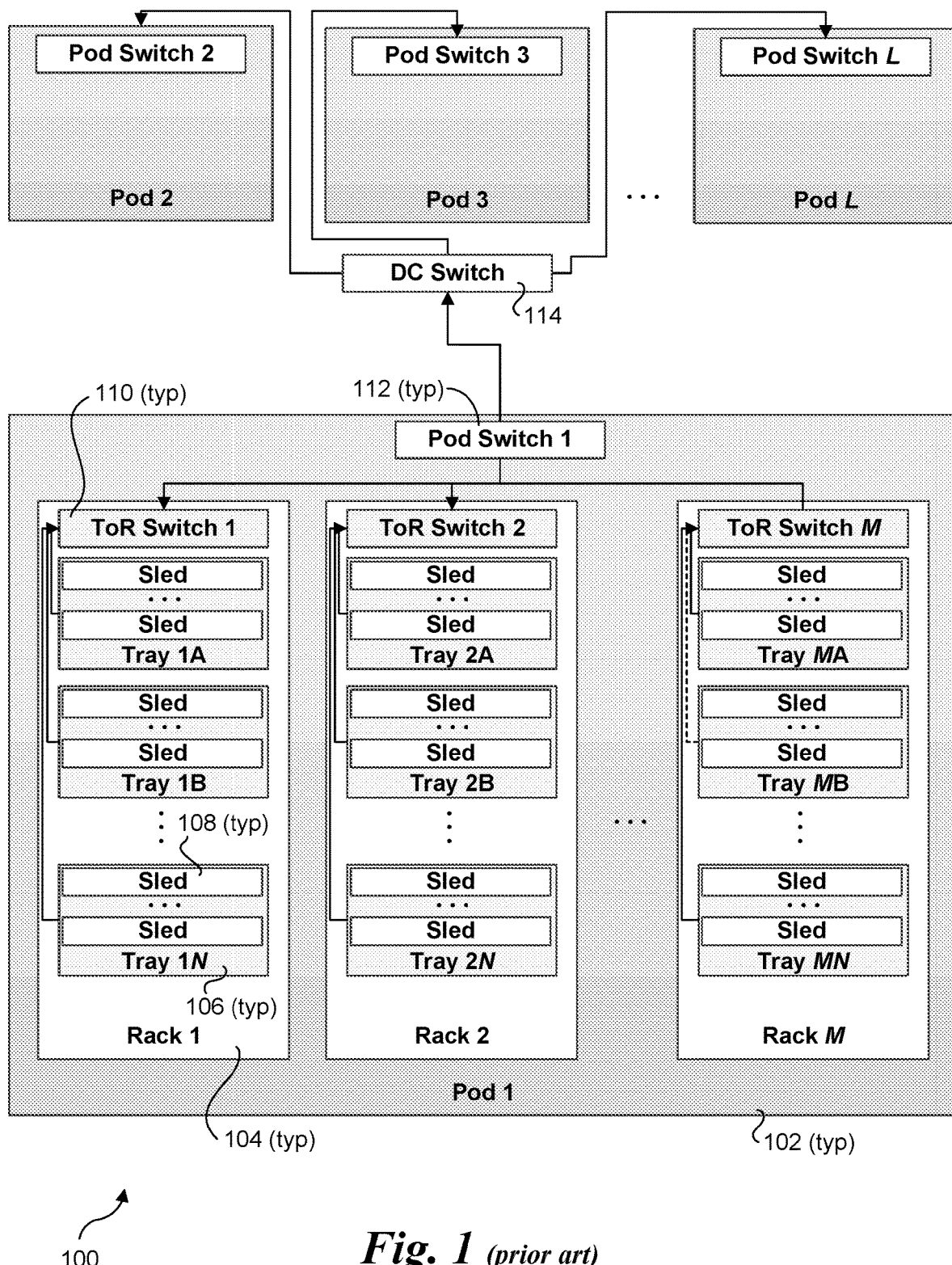
FIG. 1 is a schematic diagram of a conventional physical rack configuration in a data center.

Embodiments of mechanisms for out-of-band (OOB) management of Field Programmable Gate Array (FPGA) bitstreams and associated methods, apparatus, systems and firmware are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
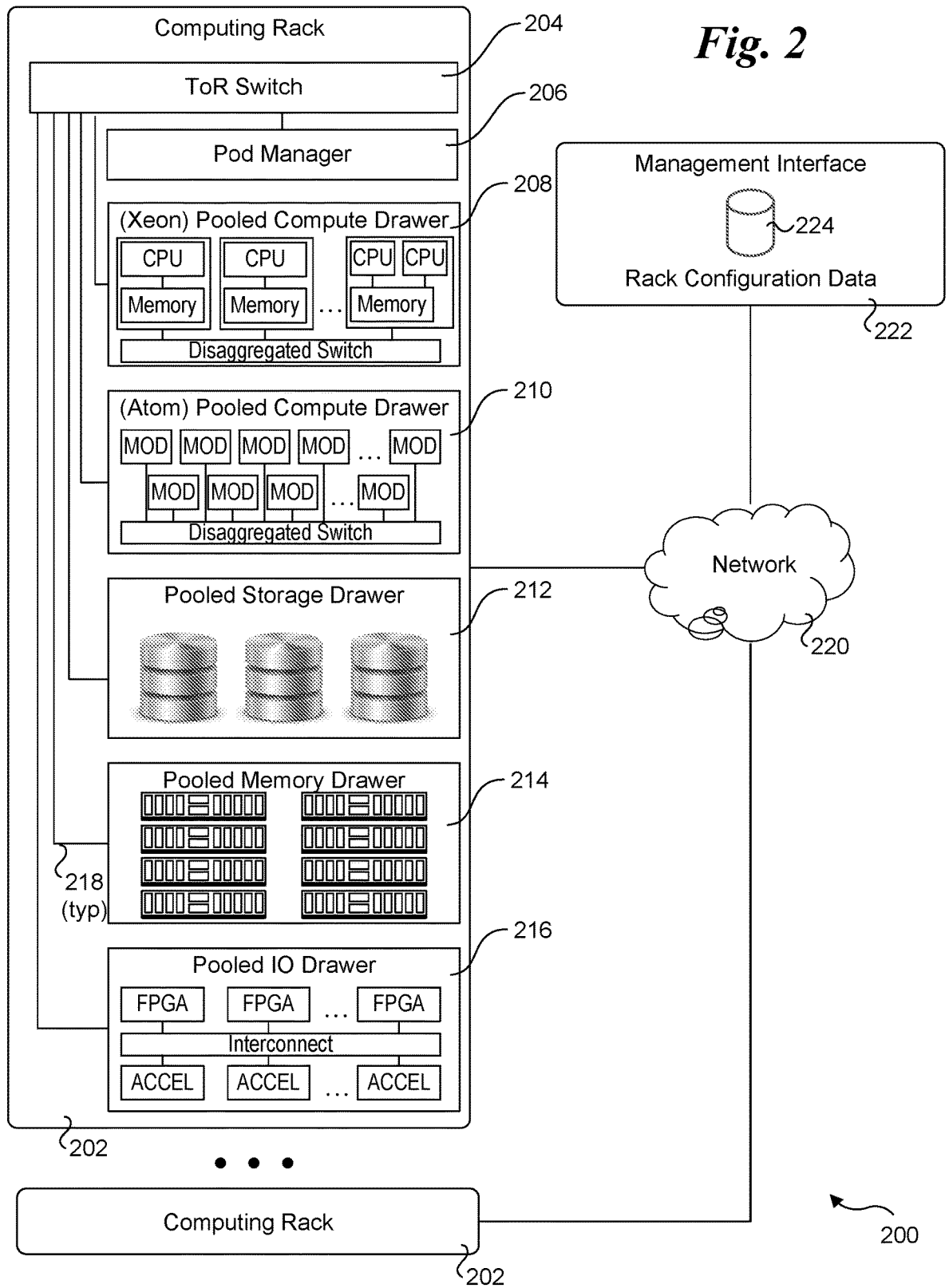
FIG. 2 is a schematic diagram of a Rack Scale Architecture (RSA) configuration in a data center, according to one embodiment.

An exemplary RSD environment 200 is illustrated in FIG. 2. RSD environment 200 includes multiple computing racks 202, each including a Top of Rack (ToR) switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 208, and INTEL® ATOM™ pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSD environment 200 further includes a management interface 222 that is used to manage various aspects of the RSD environment. This includes managing rack configuration, with corresponding parameters stored as rack configuration data 224.

Figure 3:
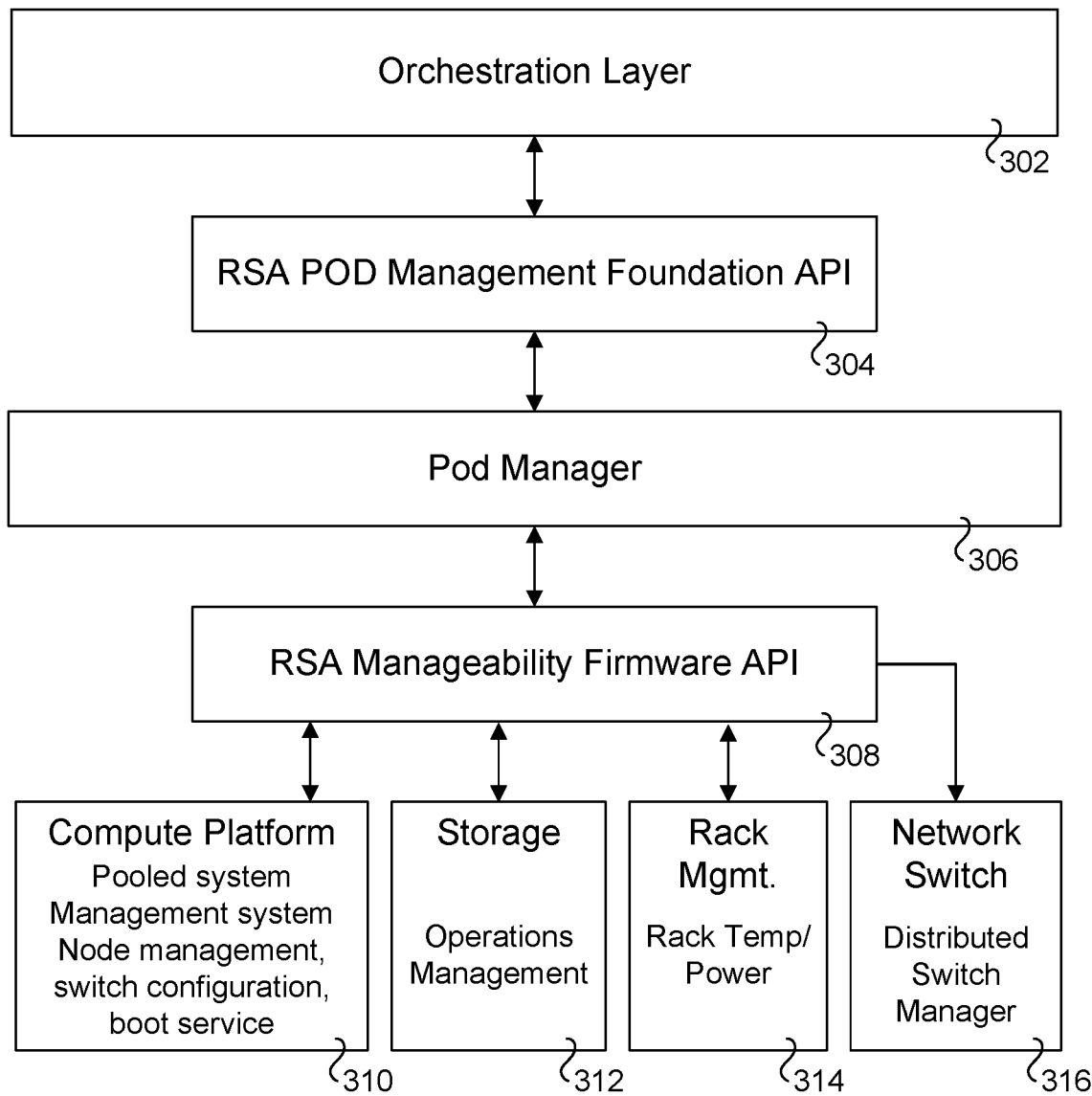
FIG. 3 is a block diagram of an RSA management architecture, according to one embodiment

FIG. 3 shows one embodiment of an RSD management architecture 300. The RSD management architecture includes multiple software and firmware components configured in a layered architecture including an orchestration layer 302, an RSD pod management foundation API (Application Program Interface), a pod manager 306, and an RSD manageability firmware API 308. The bottom layer of RSD management architecture includes a compute platform management component 310, a storage management component 312, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 4 and discussed below.

Figure 4:
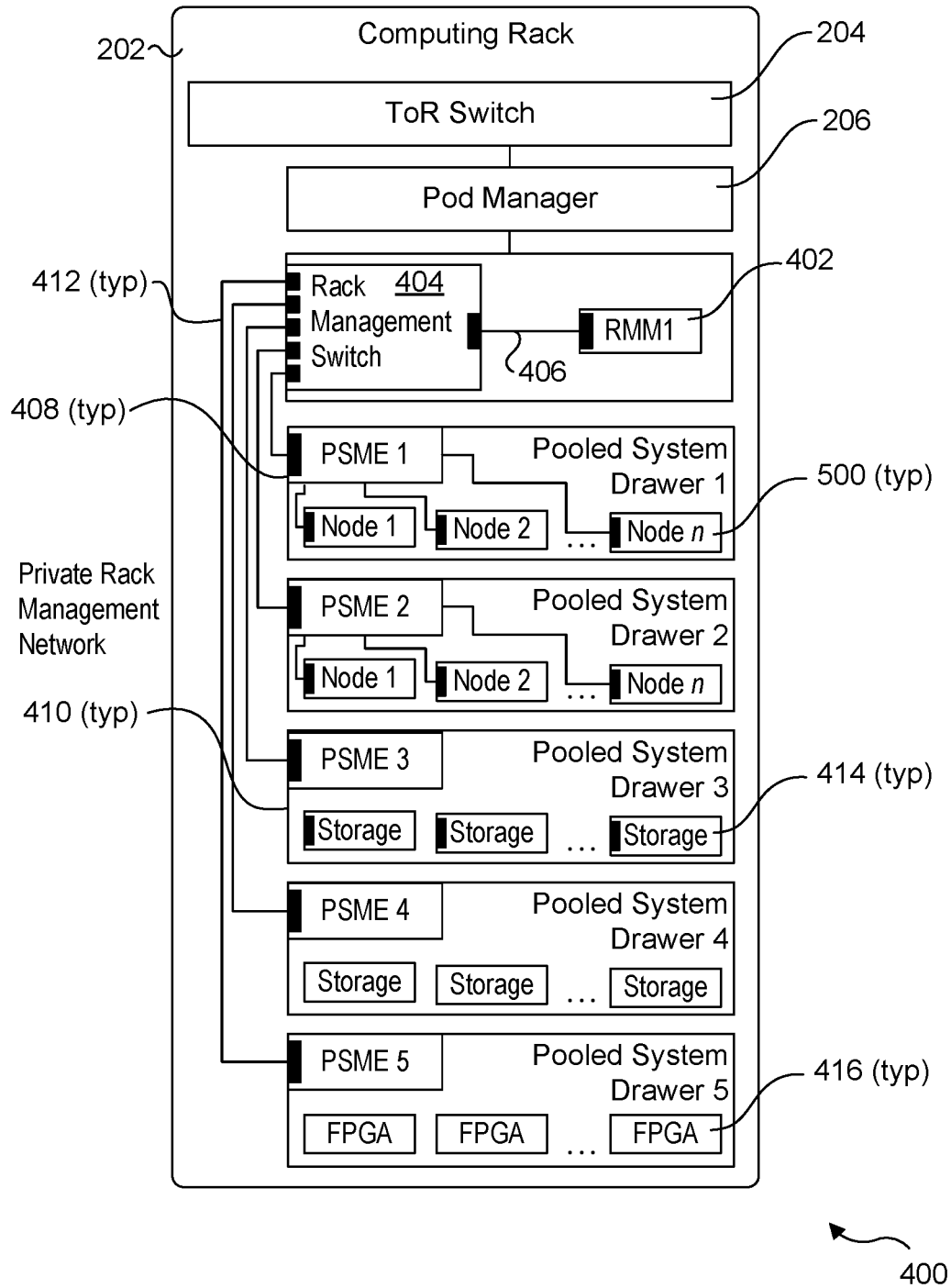
FIG. 4 is a schematic diagram showing further details of an RSA rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3, 4, and 5 respective include a plurality of storage resources 414, a plurality of memory resources 415, and a plurality of IO accelerator resources 416.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Under several of today's workloads, there is a need to perform compute-intensive operations at scale. For example, security measures employ encryption and decryption operations that are mathematically complex, requiring significant processor bandwidth. To address this need, tasks such as encryption and decryption may be offloaded to FPGAs that are programmed to perform specific tasks more efficiently. Moreover, the gates in a given FGPA may be programmed to enable several workloads to be processed in parallel.

Generally, FPGAs do not come pre-programmed (at the least they need to be programmed once). Rather, FPGAs are programmed using an FPGA bitstream that is provided to the FPGA to program the FPGA's programmable logic by configuring it array of gates. Under conventional practices for data center implementations, the FPGA is programmed through an operating system running on a host compute node in which the FPGA is installed. The operating system will usually be in communication with a management entity in the data center, and receives the FPGA bitstream content as a file from the management entity over a network connecting the management entity to the operating system. This technique is referred to as an "in-band" approach, which directly involves the operating system.

In today's data center environment, compute nodes may be dynamically composed to meet PaaS and IaaS requests from customers. Under data center architectures such as RSD, compute nodes are composed by using compute, memory, storage (and possibly other) resources that may be located in separate pooled system drawers. In addition, today's data center environment is also highly virtualized, with operating systems and their applications running on virtual machines or in containers, as opposed to the historical approach under which operating systems are run directly on platform hardware.

This creates a problem. Preferably, the compute node is first composed with is physical resources prior to an operating system being launched. Under a virtualized platform, a hypervisor or OS virtualization layer is used to host one or more virtual machines (VMs) or containers on which respective operating systems and/or applications are run. The hypervisor or OS virtualization layer is configured to allocate selective portions of the underlying platform's composed physical resources to each operating system instance or container (as applicable). For example, supposed a given compute node has been composed to have 2 TeraByte (2 TB) of storage space, and the compute node is to host four VMs, each having allocated 25% (500 GigaBytes (GB)) of the total storage space. In order to allocate 500 GB to an operating system instance, the 2 TB of storage space needs to be configured first.

A somewhat similar situation applies to FPGAs. As discussed above, under the conventional approach, an FPGA would be programmed by an operating system running on a platform (e.g., a compute node comprising a server, server module or server blade, etc.). However, in the virtualized environments the resources to be used should be configured prior to launching the operating system instances. Thus, we have a cart before the horse type of problem: you can't program the FPGA until you have access to an operating system while it is desired to allocate FPGA resources to the operating system that have already been programmed prior to launching the OS.

In accordance with aspects of the embodiments now described, mechanisms for implementing out-of-band (OOB) management of FPGA bitstreams are provided that solve this problem. Under an OOB approach, an FPGA is programmed using an FPGA bitstream delivered through an OOB channel that does not involve the use of an operating system. This approach thus enables an FPGA (or multiple FPGAs, if applicable) to be programmed using an FPGA bitstream prior to bringing up the operating system instances on a host platform.

Figure 5:
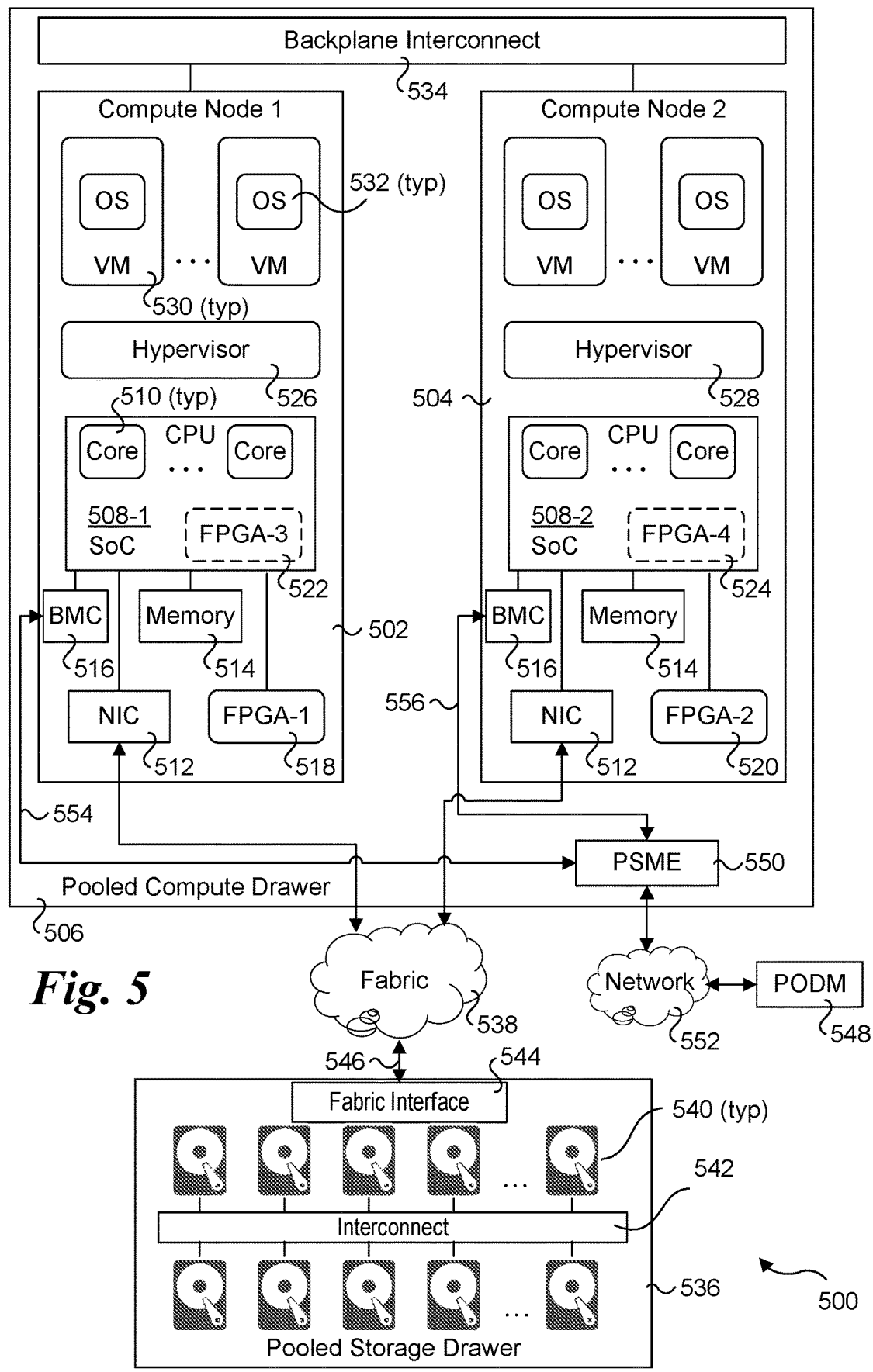
FIG. 5 is a schematic diagram illustrating an exemplary system architecture under which multiple compute nodes including FPGAs are installed in a pooled compute drawer.

A diagram illustrating an architecture 500 according to one embodiment is shown in FIG. 5. Under architecture 500, each of compute nodes 502 and 504 (also labeled and referred to herein as compute node 1 and compute node 2) are installed in a pooled compute drawer 506 and have a similar configuration. The configuration includes a processor System on a Chip (SoC) 508 (depicted as processor SoC 508-1 and 508-2) including a central processing unit (CPU) with multiple processor cores 510. Processor SoC 508 is further shown coupled to a network or fabric interface 512, and memory 514. Generally, network or fabric interface 512 is illustrative of various types of network or fabric adapters, including but not limited to Ethernet network adaptors and host fabric interface (HFI) adapters. Each compute node further includes a node management component, such as a baseboard management controller (BMC) 516. Each of network or fabric interface 512, memory 514, and BMC 516 is coupled to processor SoC 508 via an appropriate interface (not shown) and interconnect. For example, in one embodiment shown in FIG. 6 below, processor SoC 508 includes a PCIe (Peripheral Component Interconnect Express) root controller and associated PCIe root ports that are coupled to various input-output (TO) peripheral devices, such as a network or fabric interface. Meanwhile, memory 514 is coupled to processor SoC 508 via an integrated memory controller (not shown), while BMC 516 is connected to processor SoC 508 via a PCIe interface and PCIe link, another type of IO interface and link, or other types of OOB channels or the like.

Each of compute nodes 502 and 504 further is depicted as including one or more FPGA resources (also illustrated and referred to herein as FPGA devices or simply as FPGAs). In compute node 502, processor SoC 508-1 is coupled to an FPGA 518 (also labeled FPGA-1), while in compute node 504, processor SoC 508-2 is coupled to an FPGA 520 (also labeled FPGA-2). Generally, an FPGA device may be coupled to a processor SoC via an appropriate IO interface and link, including but not limited to a PCIe interface/link, a Universal Path Interconnect (UPI) link, an Intel® Accelerator Link (IAL), an Intel® Omni-Path link, and a Gen-Z link. A processor SoC may also include an embedded FPGA, such as depicted by optional FPGAs 522 and 524 (also respectively labeled FPGA-3 and FPGA-4 in the figures herein).

During runtime operations, various software components are run on each of compute nodes 502 and 504. In the embodiment illustrated in FIG. 5, these include hypervisors 526 and 528, each of which is used to host virtual machines 530 on which a respective operating system 532 is run. Generally, hypervisor 526 may be a Type-1 "bare-metal" or a Type-2 hypervisor. Alternatively, an operating system (OS) virtualization layer may be implemented in place of hypervisor 526 and 528 and used to implement containers in which respective operating systems are run. Although shown as a single layer for convenience, and OS virtualization layer may comprise multiple layered components in some embodiments, such as an operating system kernel and a virtualization layer that sits above the OS kernel. For example, under the Docker architecture, a Docker layer sits between a host OS and the containers.

Each of compute nodes 502 and 504 is further shown as being coupled to a backplane interconnect 534. Generally, backplane interconnect 534 is illustrative of various types of shared interconnects used to provide power and various data and IO signals to compute nodes in a pooled compute drawer, and although referred to herein as a "backplane" interconnect, may generally be implemented as a mid-plane or base-plane. For example, in some embodiments, each of compute nodes 504 and 506 are server blades or server modules that include an arrayed connector or circuit board edge connector that is mated with a corresponding connector on a backplane, mid-plane or base-plane in the pooled compute drawer.

Under the embodiment illustrated in architecture 500, each of compute node 502 and 504 are enabled to access storage resources in a pooled storage drawer 536 over a fabric 538. Pooled storage drawer 536 includes a plurality of storage devises 540 that are coupled to an interconnect 542. Pooled storage drawer 536 also includes a fabric interface 544 coupled to fabric 538 via a link 546.

In some embodiments, configuration of compute nodes and their resources are managed by a management entity such as a POD manager that interacts with the PSME on the pooled compute drawer to effect configuration changes and/or read existing configuration data. Accordingly, FIG. 5 further shows a POD manager 548 coupled to a PSME 550 via a network 552. PSME 550 is further coupled in communication with each BMC 516, as shown by links 554 and 556.

Figure 6:
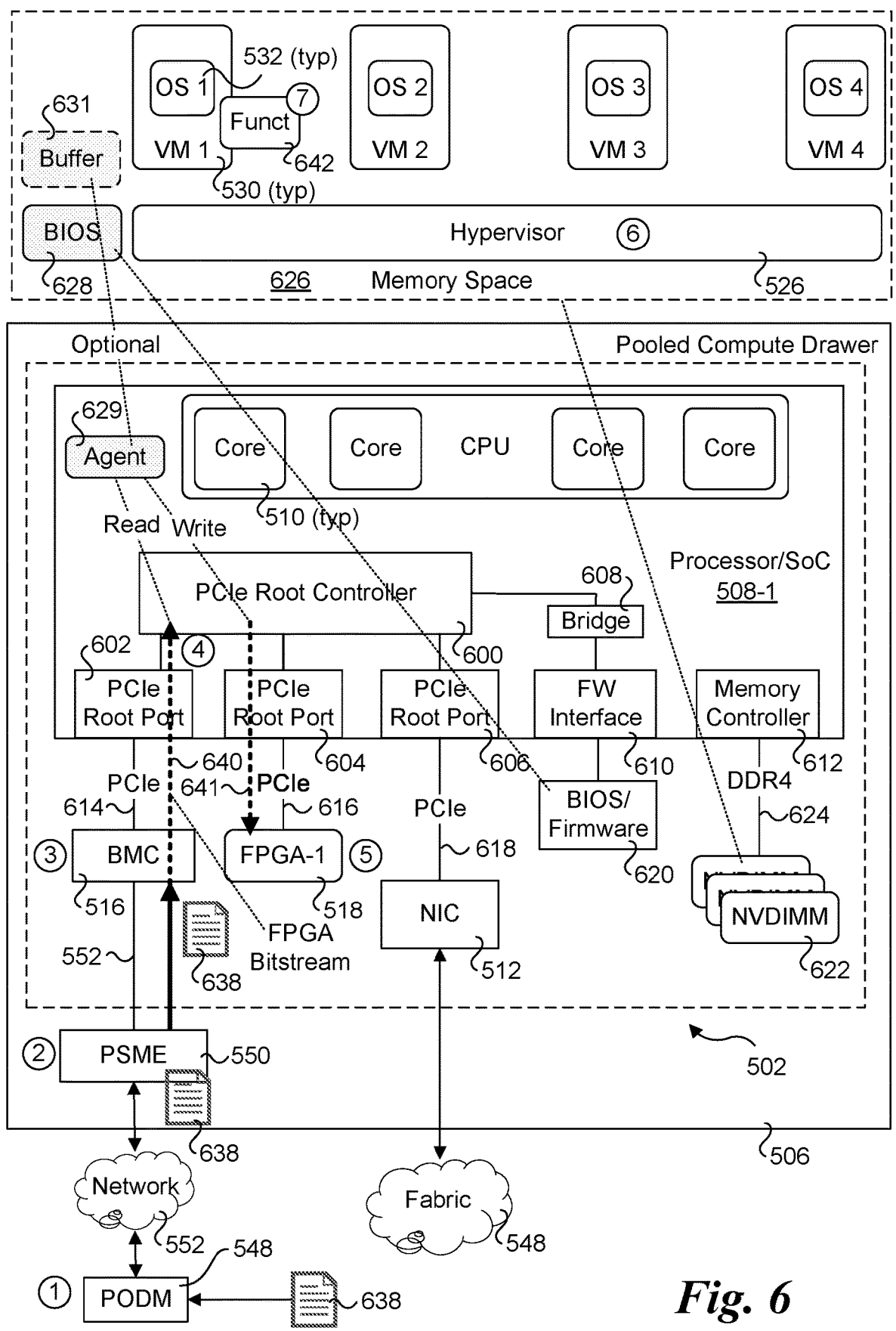
FIG. 6 is a schematic diagram of a compute node and pooled compute drawer architecture illustrating a first out-of-band mechanism under which an FPGA is programmed via an agent on a processor, according to one embodiment.

FIG. 6 shows further details of compute node 502, according to one embodiment. As before, processor SoC 508-1 includes a CPU having multiple processor cores 510. Processor SoC 508-1 is further depicted as including a PCIe root controller (RC) 600 to which three PCIe root ports 602, 604, and 606 are coupled, an IO bridge 608, a firmware (FW) interface 610 and a memory controller 612. BMC 516 is coupled to PCIe root port 602 via a PCIe link 614, while FPGA 518 is coupled to PCIe root port 604 via a PCIe link 518 and network or fabric interface 512 is coupled to PCIe root port 618. Meanwhile, a storage device 620 containing system BIOS (Basic Input Output System) and firmware is coupled to FW interface 610, while one or more Non-Volatile Dual Inline Memory Modules (NVDIMM) 622 are coupled to memory controller 612 via respective DDR4 links 624. IO bridge 608 is used to connect FW interface 610 to the PCIe interconnect infrastructure. Although not shown for simplicity, PCIe root controller is coupled to an interconnect structure to which each of processor cores is coupled, enabling each processor core to communicate with PCIe root controller.

As shown in the upper portion of FIG. 6, memory in NVDIMMs 622 is mapped to a virtual memory space 626 in which system software is run, including hypervisor 526. Hypervisor 526 is used to host multiple virtual machines, depicted as four VMs 1, 2, 3, and 4, each hosting a respective operating system instance OS 1, 2, 3, and 4. In addition, BIOS/Firmware 620 is loaded into a protected portion of memory space 626, as depicted by BIOS 628.

Processor SoC 508-1 further includes an agent 629 that is used to facilitate OOB programming of FPGA 518. Generally, agent 629 may be implemented as part of the CPU core, or may reside elsewhere on Processor SoC 508-1.

Figure 6A:
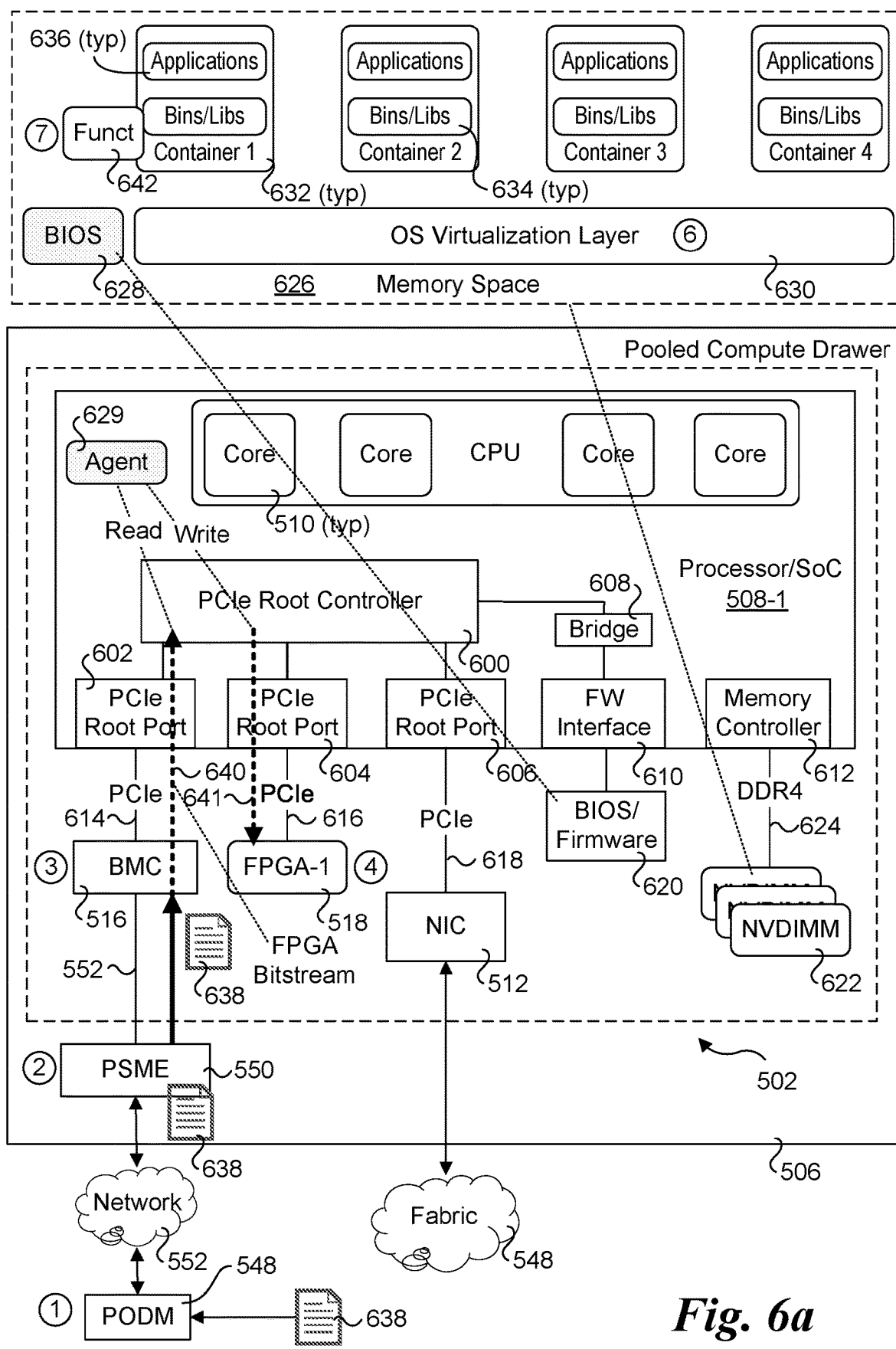
FIG. 6a is schematic diagram illustrating an alternative configuration for the compute node of FIG. 6 in which an operating system (OS) virtualization layer is used to host multiple containers in which applications are run.

FIG. 6a illustrates an alternative implementation that employs an OS virtualization layer 630 that is used to host four containers 632. The use of container-based execution environments has recently seen widespread adoption in data centers, such as containers based on Docker. (It is noted that other container-based implementation that do not use Docker may also be deployed.) Each container includes a set of binary executables and libraries (Bins/Libs) 634 that is used facilitated execution of one or more applications 636 within the container.

Figure 7:
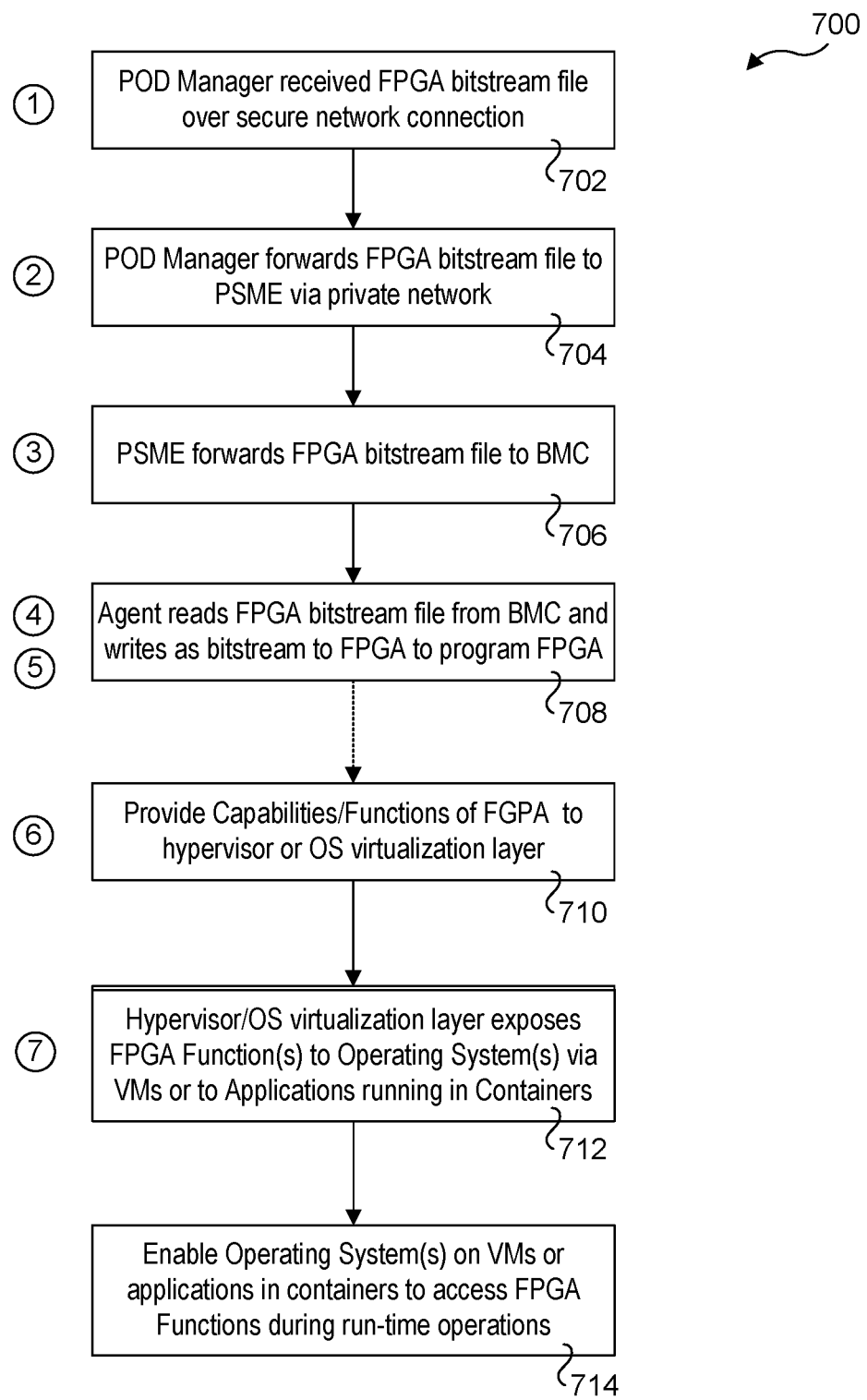

Under the embodiments of FIGS. 6 and 6a, FPGA 518 is programmed via agent 629 rather than employing the conventional scheme using an operating system. With reference to a flowchart 700 in FIG. 7, programming of the FPGA proceeds as follows. As some prior point in time, an FPGA file 638 containing an FPGA bitstream to be used to program FPGA 518 is received by PODM 548, as shown in a block 702 and as depicted by an operation '1' (the operations in FIGS. 6 and 6a are depicted as encircled numbers). In a block 704, PODM 548 forwards FPGA file 638 to PSME 550, which, in-turn, forwards FPGA file 638 to BMC 516 via link 554 in a block 706, as depicted by respective operations '2' and '3'. In a block 708, Agent 629 reads FPGA file 638 from BMC 516 using one or more PCIe reads 640 and then streams the contents of FPGA file 638 as a FPGA bitstream 642 to FPGA 518 using one or more PCIe writes 641, as depicted by operation '4' and '5'. As illustrated, the FPGA bitstream is read and written by agent 629 using the PCIe protocol over PCIe links 614 and 616.

Generally, the FPGA bitstream may be streamed in a similar manner to how the FPGA bitstream would be streamed using an operating system, except that an OOB channel (facilitated via PCIe links 614 and 616) is used. From the perspective of the FPGA, it is receiving an FPGA bitstream as it normally would receive it from an operating system. As the FPGA bitstream is received, it is processed using built-in logic to program the programmable logic on FPGA 518. Generally, the FPGA will be programmed to perform one or more functions, or otherwise include hardware-based support for performing specific operations.

In one embodiment, FPGA 518 is programmed prior to booting any of operating systems OS 1-4 or loading OS virtualization layer 630. Accordingly, in a block 710, information concerning capabilities and/or functions of (now programmed) FGPA 518 are provided to the hypervisor or OS virtualization layer during an fifth operation '6'. For the hypervisor implementation in FIG. 6, the hypervisor then exposes one or more FPGA functions to one or more of the operating systems via their respective VMs in a block 712, as depicted by a function 642 and operation '7'. For example, under some embodiments FPGA 518 may be programmed to perform an "accelerator" function, such as encryption and/or decryption. For container-based deployments, the OS virtualization layer exposes the one or more functions to the applications running in the containers. In a block 714 the operating systems running on VMs (for hypervisor implementation) or applications running in containers (for OS virtualization layer implementations) are enabled to access the FPGA function(s) during ongoing run-time operations. Having an FPGA perform these functions off-loads the corresponding compute-intensive mathematical processing from the processor cores 510, enabling higher processing throughput for workloads requiring such encryption and decryption operations.

Under some embodiments employing PCIe links, transfer of data is performed using Direct Memory Access (DMA) operations. Under DMA, transfer of data is facilitated by the PCIe components and logic in a manner that does not require utilization of any of the processing cores. Thus, Agent 629 is enabled to transfer the FPGA bitstream to FGPA 518 without requiring execution of any code on processor cores 510.

Under alternative embodiments, the PCIe read and write operations are substantially synchronous or asynchronous. Under a substantially synchronous approach, only a small amount of buffering is needed. As the FPGA bitstream file is read using PCIe, a stream of bits is received, temporarily buffered, and then written to the FPGA as a bitstream. Under an asynchronous approach, the read and write operations may take place a different times. Accordingly, it may be necessary to buffer large portions of the FPGA bitstream file, which includes the option of reading the entire FPGA bitstream into a buffer and then writing it to the FPGA. Generally, depending on the size of the buffer that is needed, an on-chip (i.e., on the processor SoC) buffer may be used, or an off-chip buffer may be used. In one embodiment, the off-chip buffer comprises a protected portion of system memory, such as depicted by a buffer 631. In another embodiment, the off-chip buffer is stored in a memory device that is not used for system memory, which may include memory stored on a memory device that is coupled to a processor SoC (not shown in the Figures herein).

Figure 8A:
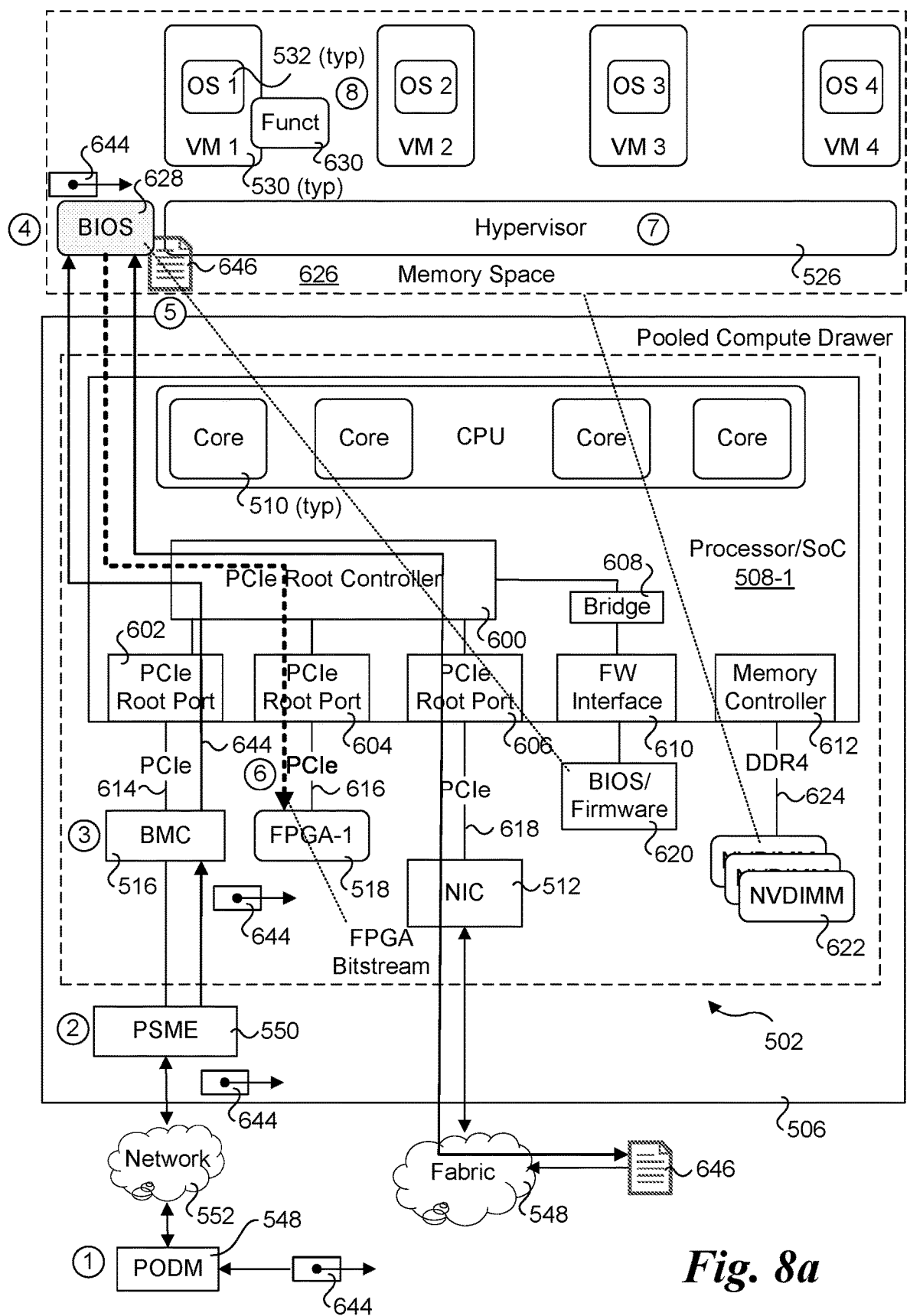
FIG. 8a is a schematic diagram of a compute node and pooled compute drawer architecture illustrating a second out-of-band mechanism under which an FPGA is programmed via a BMC and BIOS, according to one embodiment.
Figure 8B:
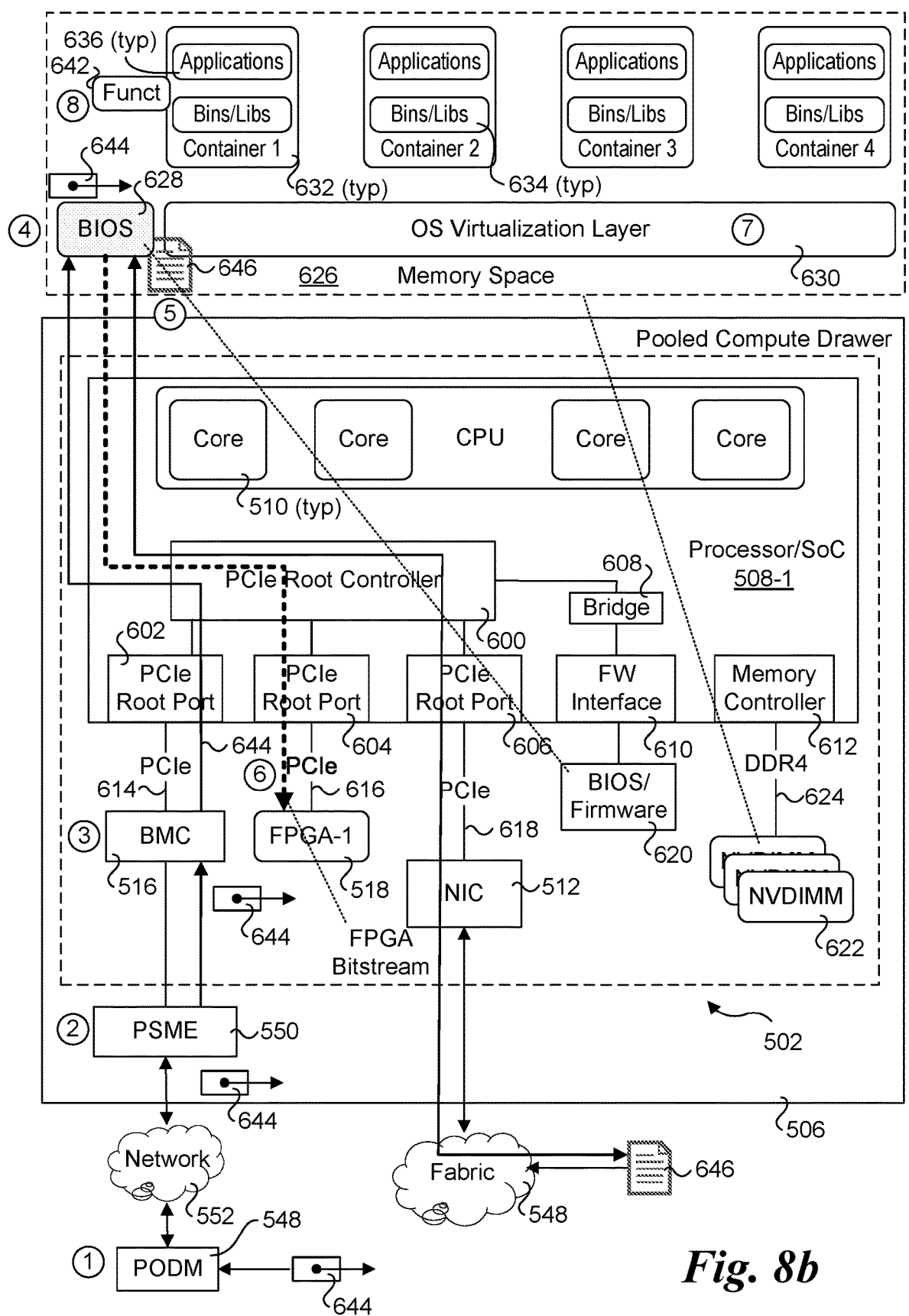
FIG. 8b is schematic diagram illustrating an alternative configuration for the compute node of FIG. 8a in which an OS virtualization layer is used to host multiple containers in which applications are run.
Figure 8C:
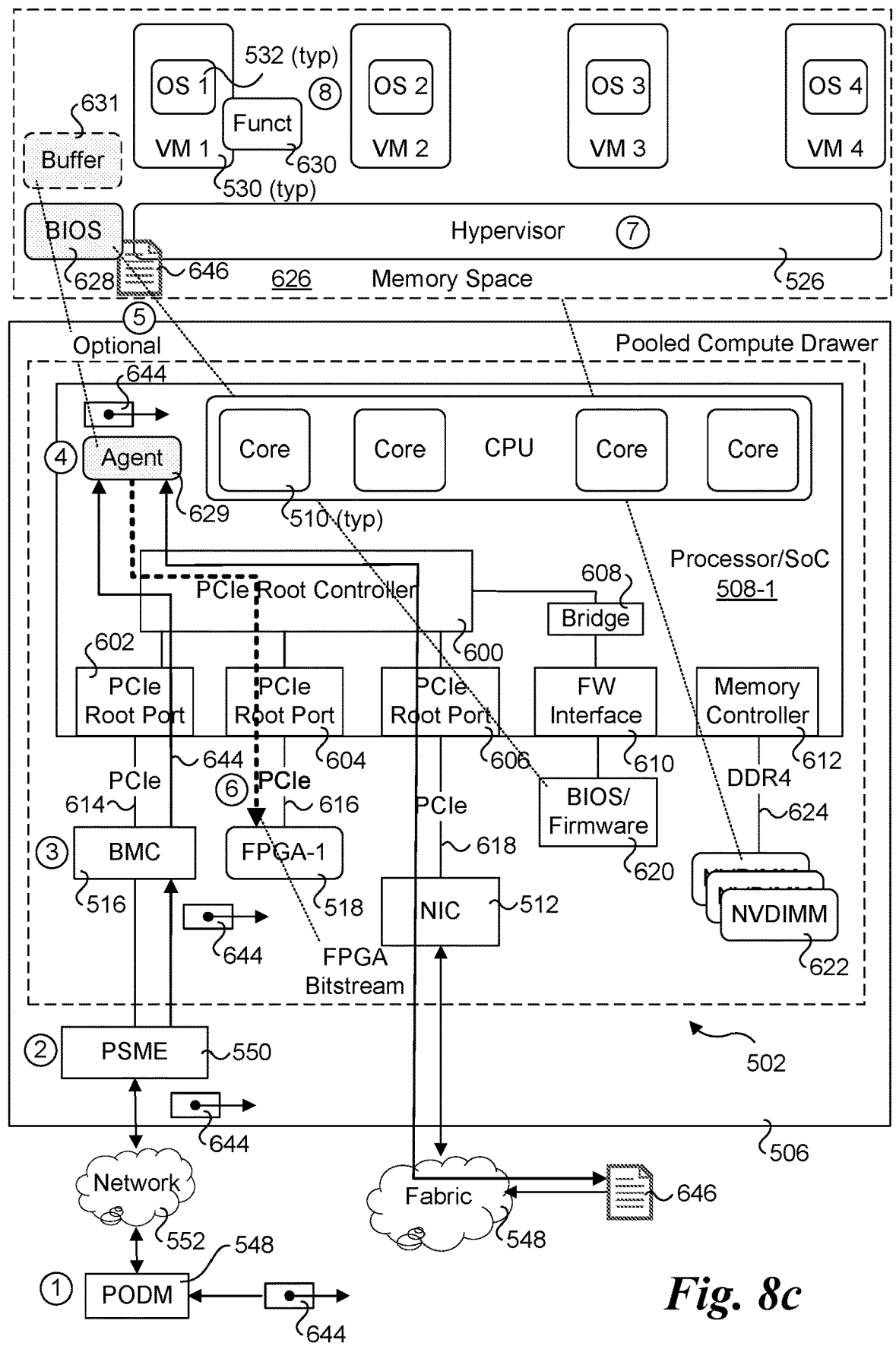
FIG. 8c is a schematic diagram of a compute node and pooled compute drawer architecture illustrating a third out-of-band mechanism under which an FPGA is programmed via a BMC and an agent on a processor, according to one embodiment.
Figure 8D:
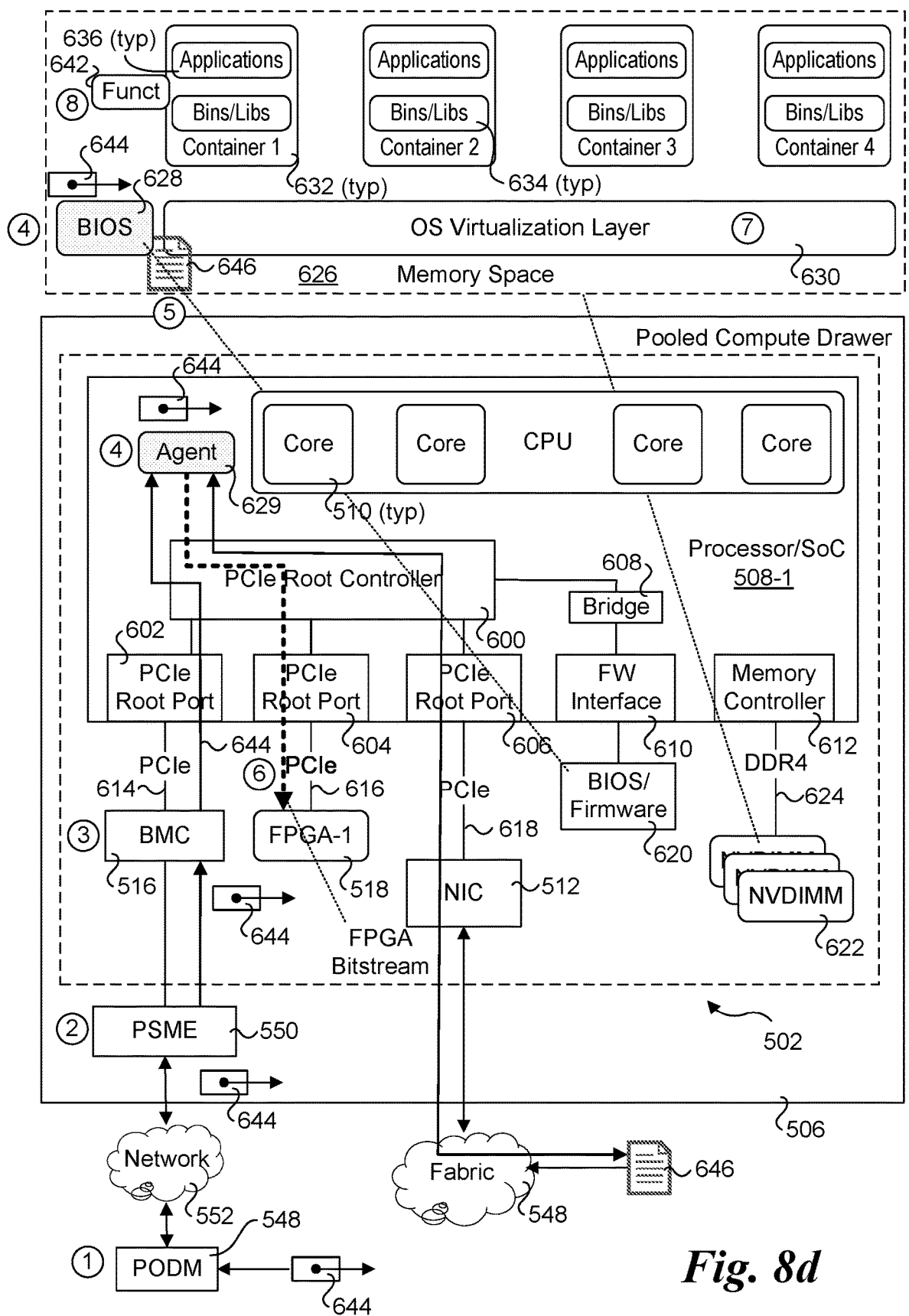
FIG. 8d is schematic diagram illustrating an alternative configuration for the compute node of FIG. 8c in which an OS virtualization layer is used to host multiple containers in which applications are run.
Figure 9A:
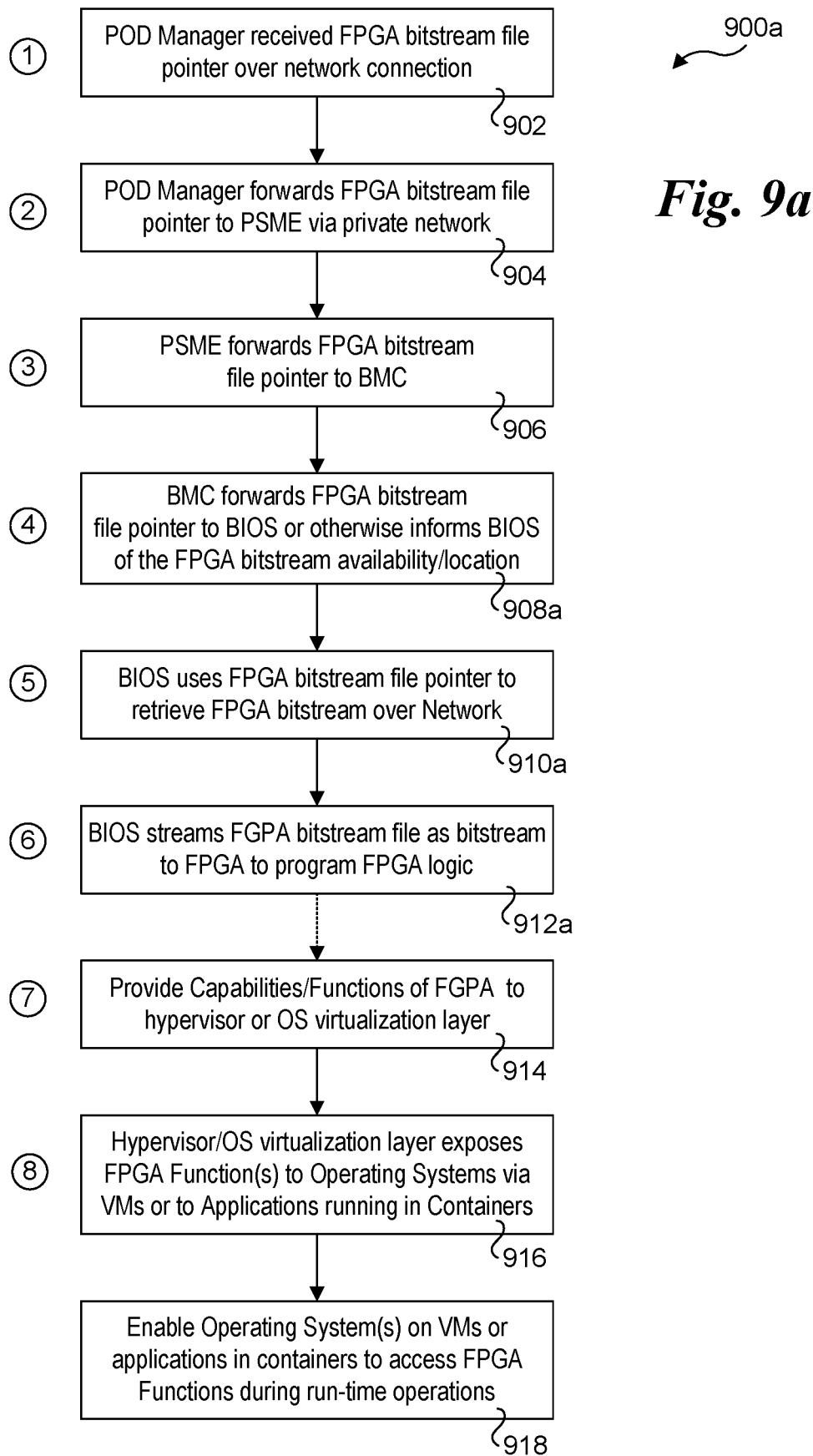
FIG. 9a is a flowchart illustrating operations for programming an FGPA using the architectures of FIGS. 8a and 8b.
Figure 9B:
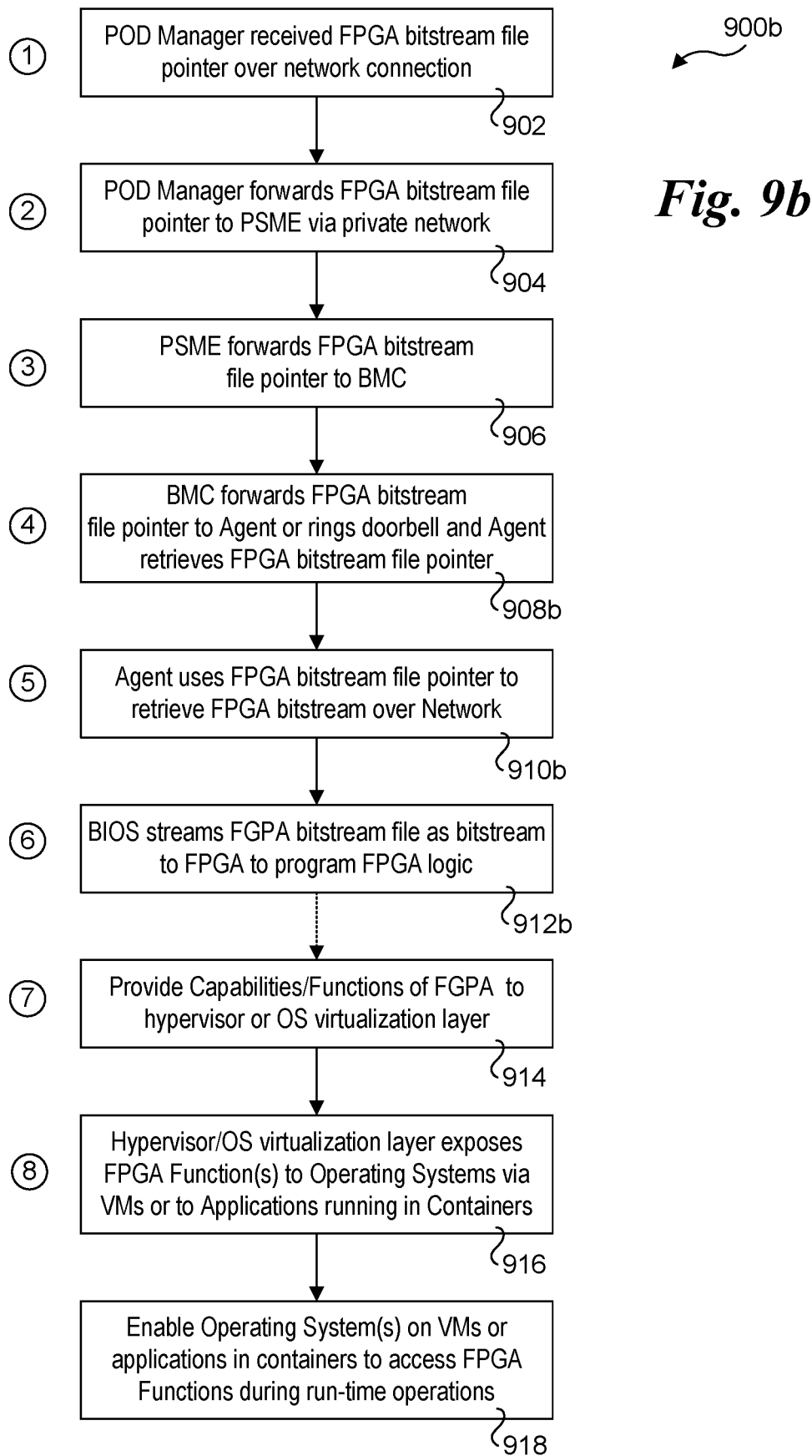
FIG. 9b is a flowchart illustrating operations for programming an FGPA using the architectures of FIGS. 8c and 8d.

Under a second approach illustrated in FIGS. 8a-8d and flowcharts 900a and 900b of FIGS. 9a and 9b, the BMC receives a pointer to a FPGA bitstream file that is stored at a location that is accessible via a network or fabric, depending on the particular deployment. In FIGS. 8a, 8b, and 9a, the pointer is passed to the BIOS (or an agent in the BIOS), which uses the pointer to retrieve the FPGA bitstream file, and then streams the FGPA bitstream to the FPGA to program it. In the embodiments of FIGS. 8c, 8d, and 9b, the pointer is passed to an agent implemented on the processor SoC, which uses the pointer to retrieve the FPGA bitstream file, and then streams the FGPA bitstream to the FPGA to program it.

With reference to flowchart 900a of FIG. 9a, the process begins in a block 901 in which the compute node is initialized. During this initialization process, the BIOS stored in storage device 620 is loaded into a protected portion of memory space 626. At some prior point in time, an FPGA file pointer 644 identifying the location of an FPGA bitstream file 646 to be used to program FPGA 518 is received by PODM 548, as shown in a block 902 and as depicted by an operation '1'. In the illustrated embodiments of FIGS. 8a and 8b, FPGA bitstream file 646 is depicted as being accessible via network or fabric 548.

In a block 904, PODM 548 forwards FPGA file pointer 644 to PSME 550, which, in-turn, forwards FPGA file pointer 644 to BMC 516 via link 554 in a block 906, as depicted by respective operations '2' and '3'. In a block 908a, the BMC forwards FPGA file pointer 644 to BIOS 628 during an operation '4', which as described above is loaded in a protected portion of memory space 626. Under one embodiment, the FPGA file pointer will be written to a memory location in memory space 626 to which BIOS 628 may access, such as via a DMA operation. Optionally, a virtual communication channel may be set up between the BMC and the BIOS via execution of BIOS code on the processor, and the FPGA bitstream file pointer may be forward to the executing BIOS as a message via the virtual communication channel. Otherwise, the BMC can inform the BIOS of the availability of the FPGA bitstream file pointer can be read from a predetermined location or the location can be specifically provided by the BMC.

During a fifth operation '5', BIOS 628 uses FPGA file pointer 644 to access FPGA bitstream file 646 via network or fabric 548, as depicted in a block 910a. This is facilitated via execution of BIOS instructions on one of cores 510. In one embodiment, the BIOS/Firmware stored in storage device 620 is a Universal Extensible Firmware Interface (UEFI) image that includes a network driver configured to access a network or fabric via network or fabric interface 512. Generally, the FPGA bitstream file pointer may be a network address or URL (Universal Resource Locator) that is used to locate the FPGA bitstream file; in the case of a URL, addition mapping information would be used to map the URL to a network address. The FPGA bitstream file can then be retrieved from the network or fabric location in the conventional manner. Upon being retrieved, the FPGA bitstream file will be written to a location in memory space 626.

In a block 912a, BIOS 628 then streams the contents of FPGA bitstream file 646 as an FPGA bitstream 648 to FPGA 518, as depicted by an operation '6'. In the illustrated embodiment, the FPGA bitstream is streamed using the PCIe protocol over PCIe link 616. However, other protocols may be used, depending on the particular IO interconnect used to couple the FPGA to the processor.

As before, prior to booting the operating systems or loading the OS virtualization layer, information concerning capabilities and/or functions of FGPA 518 are provided to the hypervisor or OS virtualization layer during a sixth operation '6', as depicted in a block 914. For a hypervisor deployments, the hypervisor then exposes one or more FPGA functions to one or more of the operating systems via their respective VMs in a block 916, as depicted by a function 642 and operation '8'. For container-based deployments, the OS virtualization layer exposes the one or more functions to the applications running in the containers. In a block 918 the operating systems running on VMs (for hypervisor implementation) or applications running in containers (for OS virtualization layer implementations) are enabled to access the FPGA function(s) during ongoing run-time operations.

An alternative scheme using an Agent within the processor SoC is illustrated in FIGS. 8c, 8d, and flowchart 900b of FIG. 9b. As indicated by like reference numbers, the operations of blocks 902, 904, 906, 914, 916, and 918 are the same for the prior embodiments corresponding to FIGS. 8a, 8b, and flowchart 900a of FIG. 9a.

The differences are in blocks 908b, 910b, and 912b. During a fourth operation '4', in block 908b the BMC either forwards the FPGA bitstream file pointer 644 to Agent 629 or the BMC rings a "doorbell" for the Agent, which informs the Agent the BMC as an FPGA bitstream file pointer, which is then retrieved from the BMC by the Agent. In a manner similar to above, under one embodiment, the FPGA file pointer will be written to a memory location in memory space 626 to which Agent 629 may access, such as via a DMA operation. Optionally, a virtual communication channel may be set up between the BMC and the Agent via execution of Agent code on the processor, and the FPGA file pointer may be forward to the executing Agent as a message via the virtual communication channel. This same virtual communication channel may be setup as part of the booting processing, and used for the doorbell operation if this scheme is to be used.

During a fifth operation '5', Agent 629 uses FPGA file pointer 644 to access FPGA bitstream file 646 via network or fabric 548, as depicted in a block 910b. This is facilitated via execution of Agent instructions on one of cores 510. In one embodiment, the BIOS/Firmware stored in storage device 620 is a Universal Extensible Firmware Interface (UEFI) image that includes a network driver configured to access a network or fabric via network or fabric interface 512, and the Agent uses this network driver to access the network or fabric. Generally, the FPGA bitstream file pointer may be a network address or URL that is used to locate the FPGA bitstream file; in the case of a URL, addition mapping information would be used to map the URL to a network address. The FPGA bitstream file can then be retrieved from the network or fabric location in the conventional manner. In one embodiment, upon being retrieved, the FPGA bitstream file will be written to a location in memory space 626, such as buffer 631.

In a block 912a, Agent 629 then streams the contents of FPGA bitstream file 646 as an FPGA bitstream 648 to FPGA 518, as depicted by an operation '6'. As before, in the illustrated embodiment, the FPGA bitstream is streamed using the PCIe protocol over PCIe link 616. However, other protocols may be used, depending on the particular IO interconnect used to couple the FPGA to the processor.

In addition to writing the FPGA bitstream file to a location in memory space 626, in one embodiment the Agent employs a small buffer and, as the FPGA bitstream file is being read (effectively received as packets comprising a bitstream), the FPGA bitstream is extracted and written to the FPGA. Generally, the small buffer could be on-chip or off-chip.

As described above, the embodiments disclosed herein facilitate out-of-band programming of FPGAs in a manner that doesn't require use of an operating system. As a result, FPGAs may be programmed to perform particular functions and tasks prior to launching an operating system. Further, platforms are enabled to be composed with one or more FGPAs in a more secure manner, and may also be dynamically re-composed using the OOB FPGA programming techniques described and illustrated herein.

Further aspects of the subject matter described herein are set out in the following numbered clauses:

1. A method performed by a compute node including a processor coupled to a management controller via a first link and to a Field Programmable Gate Array (FPGA) via a second link, the compute node communicatively coupled to at least one of a fabric and a network, the method comprising:

accessing, via an out-of-band (OOB) mechanism, an FPGA bitstream file that is either stored on the compute node or at a location accessible via the fabric or network, the FPGA bitstream file including content comprising an FPGA bitstream; and programming, via the OOB mechanism, the FPGA by streaming the FPGA bitstream to the FPGA over the second link.

2. The method of clause 1, wherein the processor further comprises an agent, further comprising:

accessing, via the agent, the FPGA bitstream file; and
writing, via the agent, the FPGA bitstream to the FPGA.

3. The method of clause 2, further comprising:

providing the FPGA bitstream file to the management controller; and reading, via the agent, the FPGA bitstream file from the management controller.

4. The method of clause 2, further comprising:

one of providing a pointer to the FPGA bitstream file to the agent or accessing the pointer to the FPGA bitstream file via the agent, the pointer to the FPGA bitstream file identifying a location of the FPGA bitstream file that can be accessed via one of the fabric or network;

retrieving, via the agent, the FPGA bitstream file from the location identified by the pointer, the FPGA bitstream file being retrieved by accessing the network or the fabric; and streaming the FPGA bitstream to the FPGA to program the FPGA.

5. The method of clause 1, wherein the processor is further coupled to memory and includes BIOS that is loaded into the memory to be executed by the processor, further comprising:

accessing, via execution of the BIOS, the FPGA bitstream file; and writing, via execution of the BIOS, the FPGA bitstream to the FPGA.

6. The method of clause 5, further comprising:

providing the FPGA bitstream file to the management controller; and reading, via execution of the BIOS, the FPGA bitstream file from the management controller.

7. The method of clause 5, further comprising:

one of providing a pointer to the FPGA bitstream file to the BIOS via execution of the BIOS or accessing the pointer to the FPGA bitstream file via execution of the BIOS, the pointer to the FPGA bitstream file identifying a location of the FPGA bitstream file that can be accessed via one of the fabric or network;

retrieving, via execution of the BIOS, the FPGA bitstream file from the location identified by the pointer, the FPGA bitstream file being retrieved by accessing the network or the fabric; and streaming, via execution of the BIOS, the FPGA bitstream to the FPGA to program the FPGA.

8. The method of clause 1, wherein one of a hypervisor or operating system (OS) virtualization layer is running on the processor, further comprising providing at least one of capabilities and functions associated with the programmed FPGA to the hypervisor or the OS virtualization layer.

9. The method of clause 8, wherein the at least one of capabilities and functions associated with the programmed FPGA include one or more functions the FGPA is capable of performing that are provided to a hypervisor, further comprising:

exposing the one or more functions to at least one of a virtual machine hosted by the hypervisor or an operating system running on a virtual machine hosted by the processor; and enabling the operating system to access the FPGA to perform the one or more functions.

10. The method of clause 8, wherein the at least one of capabilities and functions associated with the programmed FPGA include one or more functions the FGPA is capable of performing that are provided to the OS virtualization layer, further comprising:

exposing the one or more functions to at least one of a container hosted by the OS virtualization layer and an application running in the container; and enabling the application to access the FPGA to perform the one or more functions.

11. The method of any of the preceding clauses, wherein the compute node is in a pooled compute drawer including a drawer manager component that is coupled to the management controller via a third link; and wherein the drawer manager component provides the FPGA bitstream file to the management controller over the third link.

12. The method of clause 11, wherein the pooled compute drawer is installed in a rack associated with a POD manager that is communicatively coupled to the drawer manager component via a private network, further comprising transferring the FPGA bitstream file from the POD manager to the drawer manager component via the private network.

13. The method of any of the preceding clauses, wherein the management controller comprises a baseboard management controller (BMC).

14. The method of any of the preceding clauses, wherein the first and second links comprise Peripheral Component Interconnect Express (PCIe) links.

15. An apparatus, comprising:
a processor;
memory, coupled to the processor;
a management controller, communicatively coupled to the processor via a first link;
a Field Programmable Gate Array (FGPA), communicatively coupled to the processor via a second link; and
at least one of a fabric interface and a network interface;
wherein the apparatus is configured to,
access, via an out-of-band (OOB) mechanism, an FPGA bitstream file that is either stored on the compute node or at a location accessible via a fabric or network coupled to the fabric interface or network interface, the FPGA bitstream file including content comprising an FPGA bitstream; and
program, via the OOB mechanism, the FPGA by streaming the FPGA bitstream to the FPGA over the second link.

16. The apparatus of clause 15, wherein the processor further comprises an agent, and the apparatus is further configured to:
access, via the agent, the FPGA bitstream file; and
write, via the agent, the FPGA bitstream to the FPGA.

17. The apparatus of clause 16, further configured to:
receive the FPGA bitstream file at the management controller; and
read, via the agent, the FPGA bitstream file from the management controller.

18. The apparatus of clause 16, further configured to:
one of providing a pointer to the FPGA bitstream file to the agent or accessing the pointer to the FPGA bitstream file via the agent, the pointer to the FPGA bitstream file identifying a location of the FPGA bitstream file that can be accessed via one of the fabric or network;
retrieving, via the agent, the FPGA bitstream file from the location identified by the pointer, the FPGA bitstream file being retrieved by accessing the network or the fabric; and
streaming the FPGA bitstream to the FPGA to program the FPGA.

19. The apparatus of clause 15, wherein the processor is further coupled to memory and includes BIOS that is loaded into the memory to be executed by the processor, and the apparatus is further configured to:
access, via execution of the BIOS, the FPGA bitstream file; and
write, via execution of the BIOS, the FPGA bitstream to the FPGA.

20. The apparatus of clause 19, further configured to:
receive the FPGA bitstream file at the management controller; and
read, via execution of the BIOS, the FPGA bitstream file from the management controller.

21. The apparatus of clause 19, further configured to:
receive a pointer to the FPGA bitstream file at the management controller, the pointer to the FPGA bitstream file identifying a location of the FPGA bitstream file that can be accessed via one of the fabric or network;
one of provide the pointer to the FPGA bitstream file to the BIOS via execution of the BIOS or access the pointer to the FPGA bitstream file via execution of the BIOS,
retrieve, via execution of the BIOS, the FPGA bitstream file from the location identified by the pointer, the FPGA bitstream file being retrieved by accessing the network or the fabric; and
stream, via execution of the BIOS, the FPGA bitstream to the FPGA to program the FPGA.

22. The apparatus of clause 15, wherein the apparatus further includes one of a hypervisor or operating system virtualization layer running on the processor, and the apparatus is further configured to provide at least one of capabilities and functions associated with the programmed FPGA to the hypervisor or OS virtualization layer.

23. The apparatus of clause 22, wherein the at least one of capabilities and functions associated with the programmed FPGA include one or more functions the FGPA is capable of performing that are provided to a hypervisor, wherein the apparatus is further configured to:

expose the one or more functions to at least one of a virtual machine hosted by the hypervisor or an operating system running on a virtual machine hosted by the processor; and enable the operating system to access the FPGA to perform the one or more functions.

24. The apparatus of clause 22, wherein the at least one of capabilities and functions associated with the programmed FPGA include one or more functions the FGPA is capable of performing that are provided to the OS virtualization layer, wherein the apparatus is further configured to:

expose the one or more functions to at least one of a container hosted by the OS virtualization layer and an application running in the container; and enable the application to access the FPGA to perform the one or more functions.

25. The apparatus of any of clauses 15-24, wherein the apparatus is installed in a pooled compute drawer including a drawer manager component that is coupled to the management controller via a third link, and wherein the management controller receives the FPGA bitstream file from the drawer manager component over the third link.

26. The apparatus of any of clauses 15-25, wherein the management controller comprises a baseboard management controller (BMC).

27. The apparatus of any of clauses 15-26, wherein the first and second links comprise Peripheral Component Interconnect Express (PCIe) links.

28. A non-transitory machine readable medium having firmware instructions stored thereon, configured to be executed by a processor of a compute node having memory and a Field Programmable Gate Array (FPGA), the processor coupled to a management controller via a first link and to the FPGA via a second link, the compute node further having at least one of a fabric interface and a network interface, wherein the compute node is configured to be installed in a chassis, wherein when installed in the chassis said at least one of the fabric interface and network interface is coupled to a network or fabric, wherein the firmware instructions enable, upon execution, the compute node to:

one of receive or retrieve a pointer to an FPGA bitstream file from the management controller via the first link, the pointer to the FPGA bitstream file identifying a location at which the FGPA bitstream file is stored that is accessible via one of the fabric or the network, the FPGA bitstream file including content comprising an FPGA bitstream, retrieve the FPGA bitstream file from the location identified by the pointer, the FPGA bitstream file being retrieved by accessing one of the fabric or the network; and stream the FPGA bitstream over the second link to the FPGA to program the FPGA.

29. The non-transitory machine readable medium of clause 28, wherein the management controller is coupled to the processor via a first Peripheral Component Interconnect Express (PCIe) link, and the FPGA is coupled to the processor via a second PCIe link.

30. The non-transitory machine readable medium of clause 28, wherein one of a hypervisor or operating system (OS) virtualization layer is running on the processor, wherein execution of the firmware instructions further enables the compute node to provide at least one of capabilities and functions associated with the programmed FPGA to the hypervisor or the OS virtualization layer.

31. The non-transitory machine readable medium of clause 30, wherein the at least one of capabilities and functions associated with the programmed FPGA include one or more functions the FGPA is capable of performing that are provided to a hypervisor, wherein execution of the firmware instructions further enables the compute node to:

expose the one or more functions to at least one of a virtual machine hosted by the hypervisor or an operating system running on a virtual machine hosted by the processor; and enable the operating system to access the FPGA to perform the one or more functions.

32. The non-transitory machine readable medium of clause 30, wherein the at least one of capabilities and functions associated with the programmed FPGA include one or more functions the FGPA is capable of performing that are provided to the OS virtualization layer, wherein execution of the firmware instructions further enables the compute node to:

expose the one or more functions to at least one of a container hosted by the OS virtualization layer and an application running in the container; and enable the application to access the FPGA to perform the one or more functions.

33. A method comprising:

receiving a pointer to a Field Programmable Gate Array (FPGA) bitstream file at a management controller of a compute node, the compute node having memory and including a processor coupled to the management controller via a first link, an FPGA coupled to the processor via a second link, BIOS running in the memory, and at least one of a network interface and a fabric interface, the FPGA bitstream file including content comprising an FPGA bitstream, the pointer to the FPGA bitstream pointer identifying a location at which the FGPA bitstream file is stored that is accessible via a network coupled to the network interface or a fabric coupled to the fabric interface, wherein at least a portion of the BIOS is loaded in the memory;

forwarding the pointer to the FPGA bitstream file to the BIOS, retrieving, via the BIOS, the FPGA bitstream file from the location identified by the pointer, the FPGA bitstream file being retrieved by accessing one of the network or the fabric; and streaming the FPGA bitstream to the FPGA to program the FPGA.

34. The method of clause 33, wherein the management controller is coupled to the processor via a first Peripheral Component Interconnect Express (PCIe) link, and the FPGA is coupled to the processor via a second PCIe link.

35. The method of clause 33 or 34, wherein one of a hypervisor or operating system (OS) virtualization layer is running on the processor, further comprising providing at least one of capabilities and functions associated with the programmed FPGA to the hypervisor or the OS virtualization layer.

36. The method of clause 35, wherein the at least one of capabilities and functions associated with the programmed FPGA include one or more functions the FGPA is capable of performing that are provided to a hypervisor, further comprising:

exposing the one or more functions to at least one of a virtual machine hosted by the hypervisor or an operating system running on a virtual machine hosted by the processor; and enabling the operating system to access the FPGA to perform the one or more functions.

37. The method of clause 35, wherein the at least one of capabilities and functions associated with the programmed FPGA include one or more functions the FGPA is capable of performing that are provided to the OS virtualization layer, further comprising:

exposing the one or more functions to at least one of a container hosted by the OS virtualization layer and an application running in the container; and enabling the application to access the FPGA to perform the one or more functions.

38. The method of any of clauses 33-37, wherein the compute node is in a pooled compute drawer including a drawer manager component that is communicatively coupled to the management controller; and wherein the drawer manager component provides the pointer to the FPGA bitstream file to the management controller.

39. The method of clause 38, wherein the pooled compute drawer is installed in a rack associated with a POD manager that is communicatively coupled to the drawer manager component via a private network, further comprising transferring the pointer to the FPGA bitstream file from the POD manager to the drawer manager component via the private network.

40. The method of any of clauses 33-39, wherein the management controller comprises a baseboard management controller (BMC).

41. A compute node, comprising:
a processor;
memory, coupled to the processor;
a storage device containing BIOS, coupled to the processor;
a management controller, coupled to the processor via a first link;
a Field Programmable Gate Array (FGPA), coupled to the processor via a second link;
one of a network interface or fabric interface, operatively coupled to the processor,
wherein the compute node is configured to be installed in a chassis, wherein when installed in the chassis said one of the network interface or fabric interface is coupled to a network or fabric, and wherein the compute node is configured, when installed in the chassis and operating, to,
load the BIOS into memory to enable execution of the BIOS by the processor;
receive a pointer to a FPGA bitstream file at a management controller, the pointer to the FPGA bitstream identifying a location at which the FGPA bitstream file is stored that is accessible via the network or the fabric;
forward the pointer to the FPGA bitstream file to the memory;
access, via execution of the BIOS, the pointer to the FPGA bitstream file from the memory;
retrieve, via execution of the BIOS, the FPGA bitstream file from the location identified by its pointer, the FPGA bitstream file being retrieved by accessing one of the network or fabric; and
stream, via execution of the BIOS, the FPGA bitstream to the FPGA over the second link.

42. The compute node of clause 41, wherein the first and second links comprise Peripheral Component Interconnect Express (PCIe) links.

43. The compute node of clause 41 or 42, wherein one of a hypervisor or operating system (OS) virtualization layer is running on the processor, and wherein the compute node is further configured to provide at least one of capabilities and functions associated with the programmed FPGA to the hypervisor or the OS virtualization layer.

44. The compute node of clause 43, wherein the at least one of capabilities and functions associated with the programmed FPGA include one or more functions the FGPA is capable of performing that are provided to a hypervisor, the compute node further configured to:

expose the one or more functions to at least one of a virtual machine hosted by the hypervisor or an operating system running on a virtual machine hosted by the processor; and enable the operating system to access the FPGA to perform the one or more functions.

45. The compute node of clause 43, wherein the at least one of capabilities and functions associated with the programmed FPGA include one or more functions the FGPA is capable of performing that are provided to the OS virtualization layer, the compute node further configured to:

expose the one or more functions to at least one of a container hosted by the OS virtualization layer and an application running in the container; and enable the application to access the FPGA to perform the one or more functions.

46. The compute node of any of clauses 41-45, wherein the chassis comprises a pooled compute drawer including a drawer manager component that is communicatively coupled to the management controller and coupled to a network; and wherein the drawer manager component is configured to:

receive, via the network, the pointer to the FPGA bitstream file; and forward the pointer to the FPGA bitstream file to the management controller.

47. The compute node of any of clauses 41-46, wherein the management controller comprises a baseboard management controller (BMC).

48. An apparatus, comprising:
a processor;
memory, coupled to the processor;
a management controller, communicatively coupled to the processor via a first link;
a Field Programmable Gate Array (FGPA), communicatively coupled to the processor via a second link;
at least one of a fabric interface and a network interface;
out-of-band (OOB) means for accessing an FPGA bitstream file that is either stored on the compute node or at a location accessible via a fabric or network coupled to the fabric interface or network interface, the FPGA bitstream file including content comprising an FPGA bitstream; and
OOB means for programming the FPGA by streaming the FPGA bitstream to the FPGA over the second link.

49. The apparatus of clause 48, wherein the processor further comprises an agent, and the apparatus further comprises means for:

accessing, via the agent, the FPGA bitstream file; and
streaming, via the agent, the FPGA bitstream to the FPGA.

50. The apparatus of clause 49, further comprising means for:
receiving the FPGA bitstream file at the management controller; and
reading, via the agent, the FPGA bitstream file from the management controller.
51. The apparatus of clause 49, further comprising means for:
one of providing a pointer to the FPGA bitstream file to the agent or accessing the pointer to the FPGA bitstream file via the agent, the pointer to the FPGA bitstream file identifying a location of the FPGA bitstream file that can be accessed via one of the fabric or network;
retrieving, via the agent, the FPGA bitstream file from the location identified by the pointer, the FPGA bitstream file being retrieved by accessing the network or the fabric; and
streaming the FPGA bitstream to the FPGA to program the FPGA.
52. The apparatus of clause 48, wherein the processor is further coupled to memory and includes BIOS that is loaded into the memory to be executed by the processor, further comprising means for:
accessing, via execution of the BIOS, the FPGA bitstream file; and
streaming, via execution of the BIOS, the FPGA bitstream to the FPGA.
53. The apparatus of clause 52, further comprising means for:
receiving the FPGA bitstream file at the management controller; and
reading, via execution of the BIOS, the FPGA bitstream file from the management controller.
54. The apparatus of clause 52, further comprising means for:
receiving a pointer to the FPGA bitstream file at the management controller, the pointer to the FPGA bitstream file identifying a location of the FPGA bitstream file that can be accessed via one of the fabric or network;
one of providing the pointer to the FPGA bitstream file to the BIOS via execution of the BIOS or accessing the pointer to the FPGA bitstream file via execution of the BIOS,
retrieving, via execution of the BIOS, the FPGA bitstream file from the location identified by the pointer, the FPGA bitstream file being retrieved by accessing the network or the fabric; and
streaming, via execution of the BIOS, the FPGA bitstream to the FPGA to program the FPGA.
55. The apparatus of clause 48, wherein the apparatus further includes one of a hypervisor or operating system virtualization layer running on the processor, and the apparatus is further configured to provide at least one of capabilities and functions associated with the programmed FPGA to the hypervisor or OS virtualization layer.
56. The apparatus of clause 55, wherein the at least one of capabilities and functions associated with the programmed FPGA include one or more functions the FGPA is capable of performing that are provided to a hypervisor, further comprising means for:
exposing the one or more functions to at least one of a virtual machine hosted by the hypervisor or an operating system running on a virtual machine hosted by the processor; and
enabling the operating system to access the FPGA to perform the one or more functions.
57. The apparatus of clause 55, wherein the at least one of capabilities and functions associated with the programmed FPGA include one or more functions the FGPA is capable of performing that are provided to the OS virtualization layer, further comprising means for:
exposing the one or more functions to at least one of a container hosted by the OS virtualization layer and an application running in the container; and
enabling the application to access the FPGA to perform the one or more functions.
58. A method performed by a compute node including a processor coupled to a management controller via a first link and to a Field Programmable Gate Array (FPGA) via a second link, the compute node communicatively coupled to at least one of a fabric or network, the method comprising:
one of receiving or retrieving an FPGA bitstream file including content comprising an FPGA bitstream; and
programming the FPGA with the FPGA bitstream using an out-of-band (OOB) mechanism under which the FPGA is programmed without use of an operating system to be run on the compute node or any operating system already running on the compute node.
59. The method of clause 58, further comprising:
accessing the FPGA bitstream file from the management controller over the first link; and
streaming the FPGA bitstream to the FPGA over the second link.
60. The method of clause 58, further comprising:
one of providing a pointer to the FPGA bitstream file or accessing the pointer to the FPGA bitstream, the pointer to the FPGA bitstream file identifying a location of the FPGA bitstream file that can be accessed via one of the fabric or network;
retrieving the FPGA bitstream file from the location identified by the pointer, the FPGA bitstream file being retrieved by accessing the network or the fabric; and
streaming the FPGA bitstream to the FPGA to program the FPGA.
61. The method of clause 58, wherein the processor is further coupled to memory and includes BIOS that is loaded into the memory to be executed by the processor, further comprising:
accessing, via execution of the BIOS, the FPGA bitstream file; and
writing, via execution of the BIOS, the FPGA bitstream to the FPGA.
62. The method of clause 61, further comprising:
providing the FPGA bitstream file to the management controller; and
reading, via execution of the BIOS, the FPGA bitstream file from the management controller.
63. The method of clause 61, further comprising:
one of providing a pointer to the FPGA bitstream file to the BIOS via execution of the BIOS or accessing the pointer to the FPGA bitstream file via execution of the BIOS, the pointer to the FPGA bitstream file identifying a location of the FPGA bitstream file that can be accessed via one of the fabric or network;
retrieving, via execution of the BIOS, the FPGA bitstream file from the location identified by the pointer, the FPGA bitstream file being retrieved by accessing the network or the fabric; and
streaming, via execution of the BIOS, the FPGA bitstream to the FPGA to program the FPGA.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including one or more computer-readable or machine-readable non-transitory storage mediums, which provides content that represents instructions that can be executed. In one embodiment, the instructions are configured to be executed in a distributed manner on multiple distributed processing elements in the rack to perform various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed by a compute node including a board to which a processor, a management controller, and a Field Programmable Gate Array (FPGA) are operatively coupled, the processor coupled to the management controller via a first link implemented in the board and communicatively coupled to the FPGA via a second link, the compute node communicatively coupled to at least one of a fabric and a network, the method comprising:
 accessing, via an out-of-band (OOB) mechanism, an FPGA bitstream file that is either stored on the compute node or at a location accessible via the fabric or network, the FPGA bitstream file including content comprising an FPGA bitstream; and
 programming, via the OOB mechanism, the FPGA by streaming the FPGA bitstream to the FPGA over the second link.

2. The method of claim 1, wherein the processor further comprises an agent, further comprising:
 accessing, via the agent, the FPGA bitstream file; and
 writing, via the agent, the FPGA bitstream to the FPGA.

3. The method of claim 2, further comprising:
 providing the FPGA bitstream file to the management controller; and
 reading, via the agent, the FPGA bitstream file from the management controller.

4. The method of claim 1, wherein the processor is further coupled to memory and includes BIOS that is loaded into the memory to be executed by the processor, further comprising:
 accessing, via execution of the BIOS, the FPGA bitstream file; and
 writing, via execution of the BIOS, the FPGA bitstream to the FPGA.

5. The method of claim 4, further comprising:
 providing the FPGA bitstream file to the management controller; and
 reading, via execution of the BIOS, the FPGA bitstream file from the management controller.

6. The method of claim 4, further comprising:
 one of providing a pointer to the FPGA bitstream file to the BIOS via execution of the BIOS or accessing the pointer to the FPGA bitstream file via execution of the BIOS, the pointer to the FPGA bitstream file identifying a location of the FPGA bitstream file that can be accessed via one of the fabric or network;
 retrieving, via execution of the BIOS, the FPGA bitstream file from the location identified by the pointer, the FPGA bitstream file being retrieved by accessing the network or the fabric; and
 streaming, via execution of the BIOS, the FPGA bitstream to the FPGA to program the FPGA.

7. The method of claim 1, wherein one of a hypervisor or operating system (OS) virtualization layer is running on the processor, further comprising providing at least one of capabilities and functions associated with the programmed FPGA to the hypervisor or the OS virtualization layer.

8. The method of claim 7, wherein the at least one of capabilities and functions associated with the programmed FPGA include one or more functions the FGPA is capable of performing that are provided to a hypervisor, further comprising:
 exposing the one or more functions to at least one of a virtual machine hosted by the hypervisor or an operating system running on a virtual machine hosted by the processor; and
 enabling the operating system to access the FPGA to perform the one or more functions.

9. The method of claim 7, wherein the at least one of capabilities and functions associated with the programmed FPGA include one or more functions the FGPA is capable of performing that are provided to the OS virtualization layer, further comprising:
 exposing the one or more functions to at least one of a container hosted by the OS virtualization layer and an application running in the container; and
 enabling the application to access the FPGA to perform the one or more functions.

10. An apparatus, comprising:
 a processor, operatively coupled to a board;
 memory, communicatively coupled to the processor;
 a management controller, operatively coupled to the board and communicatively coupled to the processor via a first link implemented in the board;
 a Field Programmable Gate Array (FGPA), operatively coupled to the board and communicatively coupled to the processor via a second link; and
 at least one of a fabric interface and a network interface;
 wherein the apparatus is configured to,
  access, via an out-of-band (OOB) mechanism, an FPGA bitstream file that is either stored on the compute node or at a location accessible via a fabric or network coupled to the fabric interface or network interface, the FPGA bitstream file including content comprising an FPGA bitstream; and
  program, via the OOB mechanism, the FPGA by streaming the FPGA bitstream to the FPGA over the second link.

11. The apparatus of claim 10, wherein the processor further comprises an agent, and the apparatus is further configured to:
 access, via the agent, the FPGA bitstream file; and
 write, via the agent, the FPGA bitstream to the FPGA.

12. The apparatus of claim 10, further configured to:
 receive the FPGA bitstream file at the management controller; and
 read, via the agent, the FPGA bitstream file from the management controller.

13. The apparatus of claim 10, wherein the processor is further coupled to memory and includes BIOS that is loaded into the memory to be executed by the processor, and the apparatus is further configured to:
 access, via execution of the BIOS, the FPGA bitstream file; and
 write, via execution of the BIOS, the FPGA bitstream to the FPGA.

14. The apparatus of claim 13, further configured to:
 receive the FPGA bitstream file at the management controller; and
 read, via execution of the BIOS, the FPGA bitstream file from the management controller.

15. The apparatus of claim 13, further configured to:
 receive a pointer to the FPGA bitstream file at the management controller, the pointer to the FPGA bitstream file identifying a location of the FPGA bitstream file that can be accessed via one of the fabric or network;

one of provide the pointer to the FPGA bitstream file to the BIOS via execution of the BIOS or access the pointer to the FPGA bitstream file via execution of the BIOS, retrieve, via execution of the BIOS, the FPGA bitstream file from the location identified by the pointer, the FPGA bitstream file being retrieved by accessing the network or the fabric; and stream, via execution of the BIOS, the FPGA bitstream to the FPGA to program the FPGA.

16. The apparatus of claim 10, wherein the apparatus further includes one of a hypervisor or operating system virtualization layer running on the processor, and the apparatus is further configured to provide at least one of capabilities and functions associated with the programmed FPGA to the hypervisor or OS virtualization layer.

17. The apparatus of claim 16, wherein the at least one of capabilities and functions associated with the programmed FPGA include one or more functions the FGPA is capable of performing that are provided to a hypervisor, wherein the apparatus is further configured to:

expose the one or more functions to at least one of a virtual machine hosted by the hypervisor or an operating system running on a virtual machine hosted by the processor; and enable the operating system to access the FPGA to perform the one or more functions.

18. The apparatus of claim 16, wherein the at least one of capabilities and functions associated with the programmed FPGA include one or more functions the FGPA is capable of performing that are provided to the OS virtualization layer, wherein the apparatus is further configured to:

expose the one or more functions to at least one of a container hosted by the OS virtualization layer and an application running in the container; and enable the application to access the FPGA to perform the one or more functions.

19. A non-transitory machine readable medium, having firmware instructions stored thereon, configured to be executed by a processor of a compute node having memory and a Field Programmable Gate Array (FPGA), the processor operatively coupled to a board and coupled to a management controller via a first link implemented in the board and to the FPGA operatively coupled to the board and coupled to the processor via a second link, the compute node further having at least one of a fabric interface and a network interface, wherein execution of the firmware instructions enables the compute node to:

one of receive or retrieve a reference to an FPGA bitstream file from the management controller via the first link, the reference to the FPGA bitstream file identifying a location at which the FGPA bitstream file is stored that is accessible via one of a fabric coupled to the fabric interface or a network coupled to the network interface, the FPGA bitstream file including content comprising an FPGA bitstream, retrieve, by accessing one of the fabric or the network, the FPGA bitstream file from the location identified by the reference; and program the FPGA with the FPGA bitstream.

20. The non-transitory machine readable medium of claim 19, wherein the management controller is coupled to the processor via a first Peripheral Component Interconnect Express (PCIe) link, and the FPGA is coupled to the processor via a second PCIe link.

* * * * *

UNITED STATES PATENT AND TRADEMARK OFFICE
CERTIFICATE OF CORRECTION

PATENT NO. : 11,831,486 B2
APPLICATION NO. : 17/702707
DATED : November 28, 2023
INVENTOR(S) : Murugasamy K. Nachimuthu and Mohan J. Kumar It is certified that error appears in the above-identified patent and that said Letters Patent is hereby corrected as shown below:

In the Claims

Column 24 Line 18 Claim 10:
"a Field Programmable Gate Array (FGPA), operatively coupled to the board and communicatively coupled to the processor via a second link;"
Should read:
a Field Programmable Gate Array (FPGA), operatively coupled to the board and communicatively coupled to the processor via a second link;

Column 25 Line 18 Claim 17:
"wherein the at least one of capabilities and functions associated with the programmed FPGA include one or more functions the FGPA is capable of performing that are provided to a hypervisor,"
Should read:
wherein the at least one of capabilities and functions associated with the programmed FPGA include one or more functions the FPGA is capable of performing that are provided to a hypervisor, Column 25 Line 29 Claim 18:
"wherein the at least one of capabilities and functions associated with the programmed FPGA include one or more functions the FGPA is capable of performing that are provided to the OS virtualization layer,"
Should read:
wherein the at least one of capabilities and functions associated with the programmed FPGA include one or more functions the FPGA is capable of performing that are provided to the OS virtualization layer, Column 26 Line 29 Claim 19:
"the reference to the FPGA bitstream file identifying a location at which the FGPA bitstream file is stored that is accessible via one of a fabric coupled to the fabric interface or a network coupled to the network interface,"

Signed and Sealed this
Twenty-fifth Day of June, 2024

Katherine Kelly Vidal
*Director of the United States Patent and Trademark Office*

Should read:

the reference to the FPGA bitstream file identifying a location at which the FPGA bitstream file is stored that is accessible via one of a fabric coupled to the fabric interface or a network coupled to the network interface,